(12) United States Patent
Imamura

(10) Patent No.: US 7,965,325 B2
(45) Date of Patent: Jun. 21, 2011

(54) DISTORTION-CORRECTED IMAGE GENERATION UNIT AND DISTORTION-CORRECTED IMAGE GENERATION METHOD

(75) Inventor: Kosuke Imamura, Fukushima (JP)

(73) Assignee: Alpine Electronics, Inc., Tokyo (JP)

( * ) Notice: Subject to any disclaimer, the term of this patent is extended or adjusted under 35 U.S.C. 154(b) by 420 days.

(21) Appl. No.: 12/255,932

(22) Filed: Oct. 22, 2008

(65) Prior Publication Data

US 2009/0141148 A1    Jun. 4, 2009

(30) Foreign Application Priority Data

Dec. 4, 2007  (JP) ................. 2007-313620

(51) Int. Cl.
*H04N 9/64* (2006.01)
*H04N 5/217* (2006.01)
*H04N 5/225* (2006.01)
*H04N 5/232* (2006.01)
*G02B 5/32* (2006.01)
*G06K 9/40* (2006.01)

(52) U.S. Cl. ........ 348/246; 348/241; 348/335; 348/360; 348/345; 359/16; 382/274; 382/275

(58) Field of Classification Search .............. 348/241, 348/243, 360, 335, 246; 359/637, 16; 396/79, 396/80; 382/254, 255, 274, 275
See application file for complete search history.

(56) References Cited

U.S. PATENT DOCUMENTS

| 6,201,574 | B1 * | 3/2001 | Martin ................. 348/315 |
| 6,538,691 | B1 * | 3/2003 | Macy et al. .......... 348/222.1 |
| 7,301,565 | B2 * | 11/2007 | Kurase ................ 348/222.1 |
| 7,307,655 | B1 | 12/2007 | Okamoto et al. |
| 7,339,617 | B1 * | 3/2008 | Kondo et al. ........ 348/222.1 |
| 2009/0046179 | A1 * | 2/2009 | Aoyama et al. ...... 348/241 |

FOREIGN PATENT DOCUMENTS

JP          3286306 A2    3/2002

\* cited by examiner

*Primary Examiner* — Lin Ye
*Assistant Examiner* — Marly Camargo
(74) *Attorney, Agent, or Firm* — Brinks Hofer Gilson & Lione

(57) ABSTRACT

An internal parameter storage unit stores, in advance, a plurality of sets of internal parameters each of which can be applied to correct a pixel position in a direction from an image principal point, i.e., a plurality of sets of internal parameters for accommodating errors of different magnitudes that occur in individual directions from an image principal point. An internal parameter selection unit selects a set of internal parameters from the plurality of sets of internal parameters stored in advance on the basis of the direction of a pixel position to be corrected from the image principal point, and a distortion-corrected image generator corrects distortion on the basis of the selected set of internal parameters, so that, even when a surface of a lens is not exactly parallel to a surface of an image pickup device, distortion is corrected more accurately.

18 Claims, 23 Drawing Sheets

FIG. 2A

| RADIAL LINE ID | FIRST COEFFICIENT | SECOND COEFFICIENT | THIRD COEFFICIENT | FOURTH COEFFICIENT | FIFTH COEFFICIENT | RADIAL LINE INFORMATION |
|---|---|---|---|---|---|---|
| H01 | $k_{11}$ | $k_{12}$ | $k_{13}$ | $k_{14}$ | $k_{15}$ | ... |
| H02 | $k_{21}$ | $k_{22}$ | $k_{23}$ | $k_{24}$ | $k_{25}$ | ... |
| H03 | $k_{31}$ | $k_{32}$ | $k_{33}$ | $k_{34}$ | $k_{35}$ | ... |
| H04 | $k_{41}$ | $k_{42}$ | $k_{43}$ | $k_{44}$ | $k_{45}$ | ... |
| H05 | $k_{51}$ | $k_{52}$ | $z_{53}$ | $k_{54}$ | $k_{55}$ | ... |
| H06 | $k_{61}$ | $k_{62}$ | $k_{63}$ | $k_{64}$ | $k_{65}$ | ... |
| H07 | $k_{71}$ | $k_{72}$ | $k_{73}$ | $k_{74}$ | $k_{75}$ | ... |
| H08 | $k_{81}$ | $k_{82}$ | $k_{83}$ | $k_{84}$ | $k_{85}$ | ... |

FIG. 2B

| REGION ID | FIRST COEFFICIENT | SECOND COEFFICIENT | THIRD COEFFICIENT | FOURTH COEFFICIENT | FIFTH COEFFICIENT | DIVIDED REGION INFORMATION |
|---|---|---|---|---|---|---|
| R01 | $k_{11}$ | $k_{12}$ | $k_{13}$ | $k_{14}$ | $k_{15}$ | ... |
| R02 | $k_{21}$ | $k_{22}$ | $k_{23}$ | $k_{24}$ | $k_{25}$ | ... |
| R03 | $k_{31}$ | $k_{32}$ | $k_{33}$ | $k_{34}$ | $k_{35}$ | ... |
| R04 | $k_{41}$ | $k_{42}$ | $k_{43}$ | $k_{44}$ | $k_{45}$ | ... |
| R05 | $k_{51}$ | $k_{52}$ | $z_{53}$ | $k_{54}$ | $k_{55}$ | ... |
| R06 | $k_{61}$ | $k_{62}$ | $k_{63}$ | $k_{64}$ | $k_{65}$ | ... |
| R07 | $k_{71}$ | $k_{72}$ | $k_{73}$ | $k_{74}$ | $k_{75}$ | ... |
| R08 | $k_{81}$ | $k_{82}$ | $k_{83}$ | $k_{84}$ | $k_{85}$ | ... |

FIG. 3
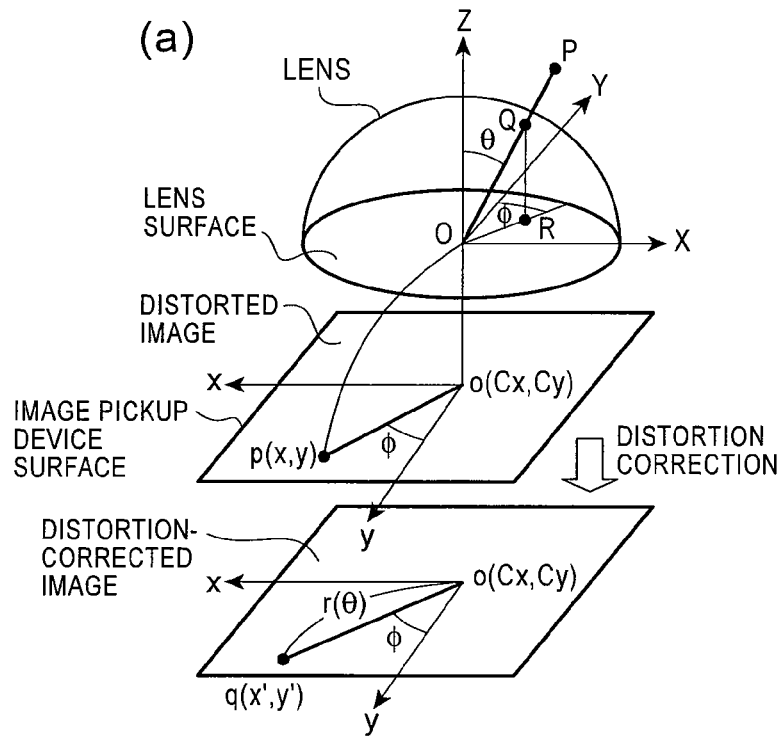
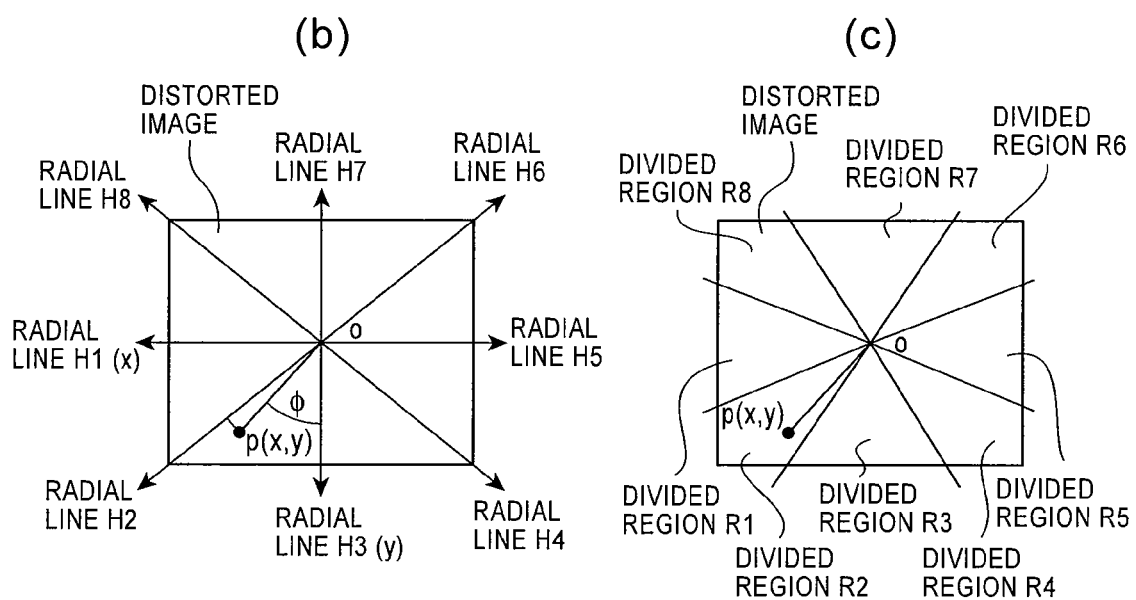

FIG. 4

(a) DIRECTION OF RADIAL LINE H1: $r_1(\theta)=k_{11}\theta+k_{12}\theta^2+k_{13}\theta^3+k_{14}\theta^4+k_{15}\theta^5$ (b) DIRECTION OF RADIAL LINE H2: $r_2(\theta)=k_{21}\theta+k_{22}\theta^2+k_{23}\theta^3+k_{24}\theta^4+k_{25}\theta^5$ (c) DIRECTION OF RADIAL LINE H3: $r_3(\theta)=k_{31}\theta+k_{32}\theta^2+k_{33}\theta^3+k_{34}\theta^4+k_{35}\theta^5$ (d) DIRECTION OF RADIAL LINE H4: $r_4(\theta)=k_{41}\theta+k_{42}\theta^2+k_{43}\theta^3+k_{44}\theta^4+k_{45}\theta^5$ (e) DIRECTION OF RADIAL LINE H5: $r_5(\theta)=k_{51}\theta+k_{52}\theta^2+k_{53}\theta^3+k_{54}\theta^4+k_{55}\theta^5$ (f) DIRECTION OF RADIAL LINE H6: $r_6(\theta)=k_{61}\theta+k_{62}\theta^2+k_{63}\theta^3+k_{64}\theta^4+k_{65}\theta^5$ (g) DIRECTION OF RADIAL LINE H7: $r_7(\theta)=k_{71}\theta+k_{72}\theta^2+k_{73}\theta^3+k_{74}\theta^4+k_{75}\theta^5$ (h) DIRECTION OF RADIAL LINE H8: $r_8(\theta)=k_{81}\theta+k_{82}\theta^2+k_{83}\theta^3+k_{84}\theta^4+k_{85}\theta^5$ FIG. 6
(a)
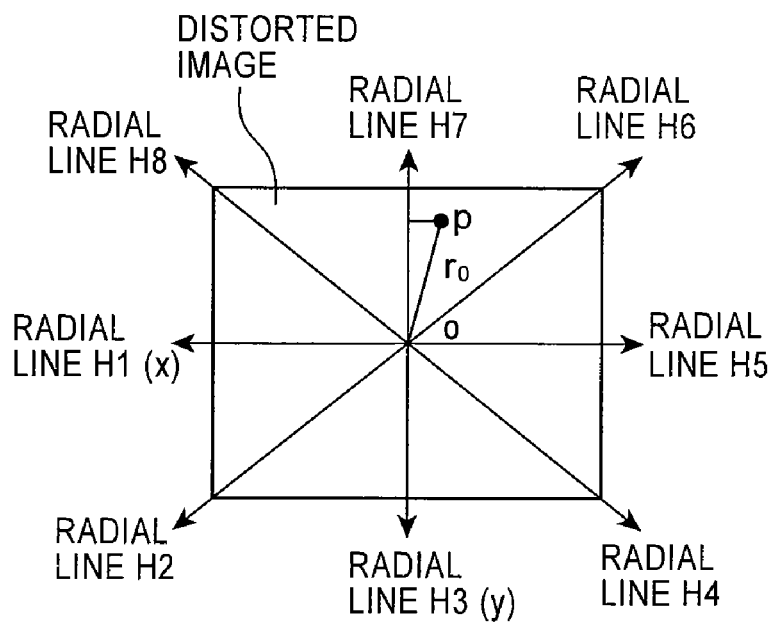
(b)
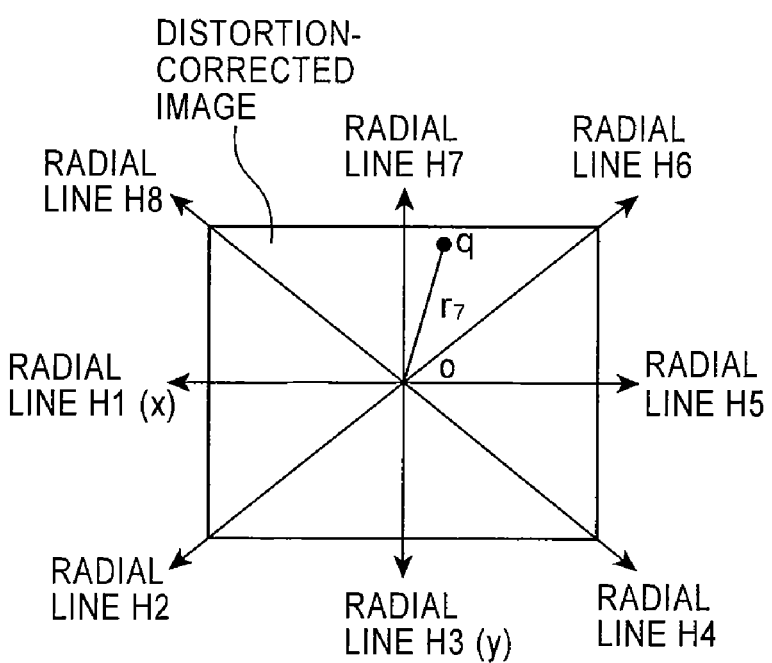

FIG. 7
(a)
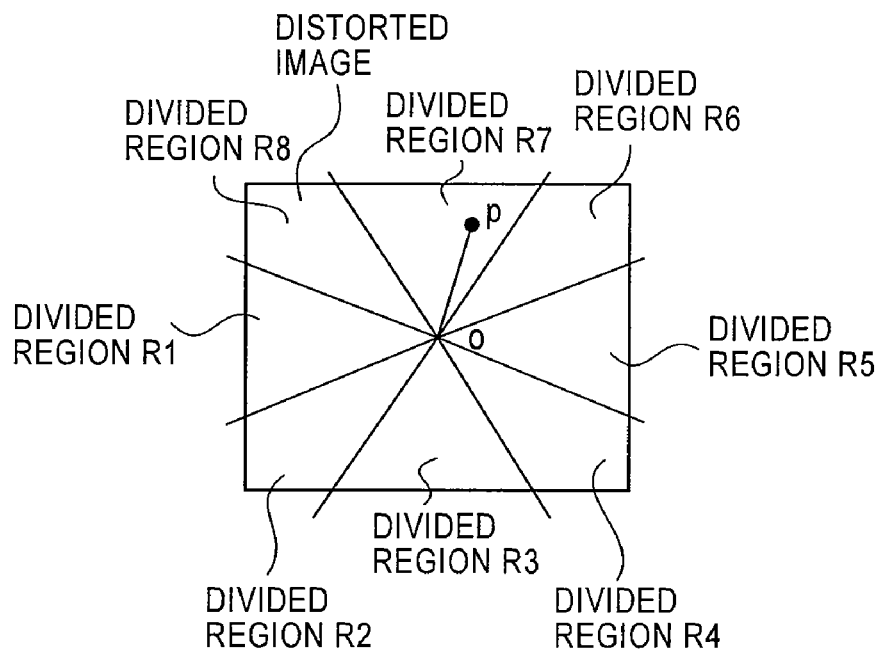
(b)
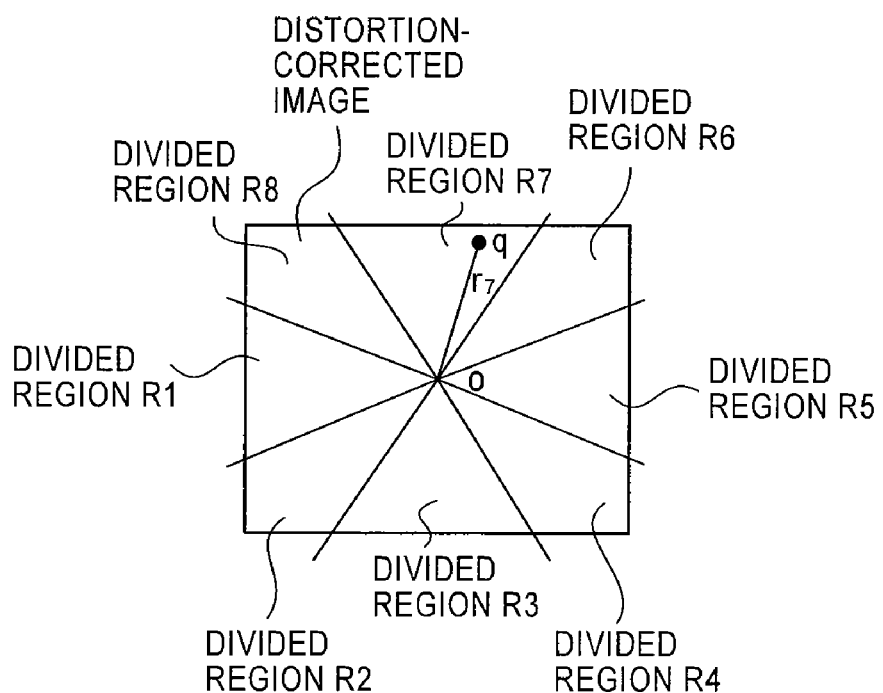

FIG. 10
(a)
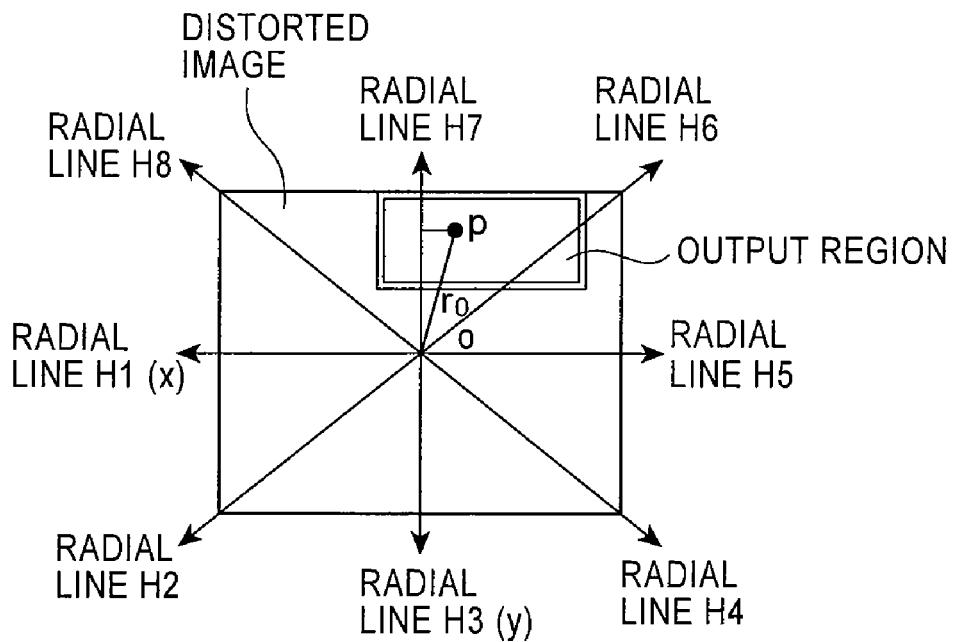
(b)
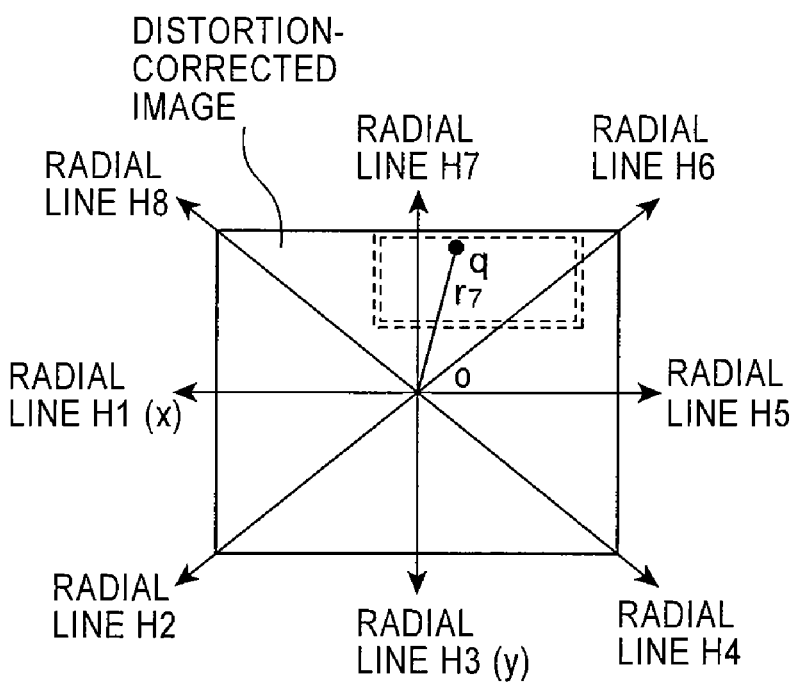

(a)

(b) $k_1 = \dfrac{d2}{d1+d2} k_{71} + \dfrac{d1}{d1+d2} k_{61}$ (c) $k_2 = \dfrac{d2}{d1+d2} k_{72} + \dfrac{d1}{d1+d2} k_{62}$ (d) $k_3 = \dfrac{d2}{d1+d2} k_{73} + \dfrac{d1}{d1+d2} k_{63}$ (e) $k_4 = \dfrac{d2}{d1+d2} k_{74} + \dfrac{d1}{d1+d2} k_{64}$ (f) $k_5 = \dfrac{d2}{d1+d2} k_{75} + \dfrac{d1}{d1+d2} k_{65}$ (g) $r_{cal}(\theta) = k_1\theta + k_2\theta^2 + k_3\theta^3 + k_4\theta^4 + k_5\theta^5$ FIG. 14
(a)
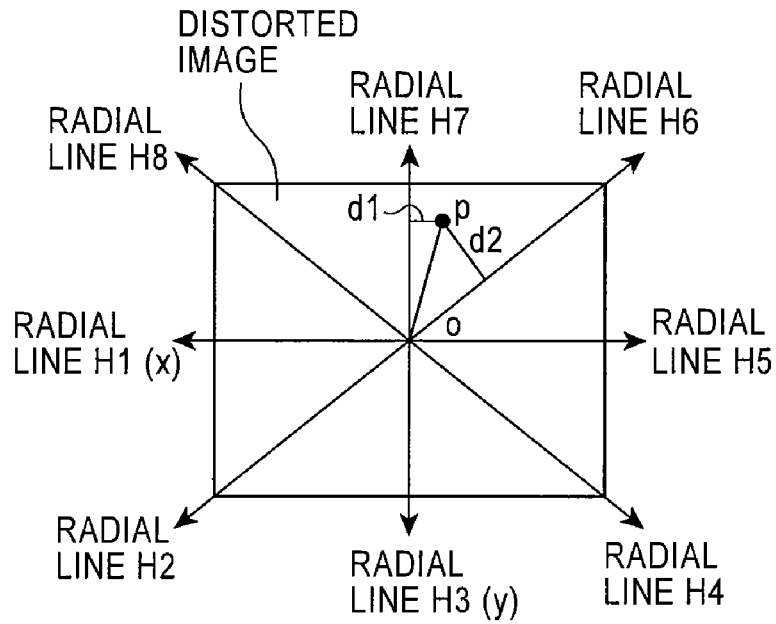
(b)
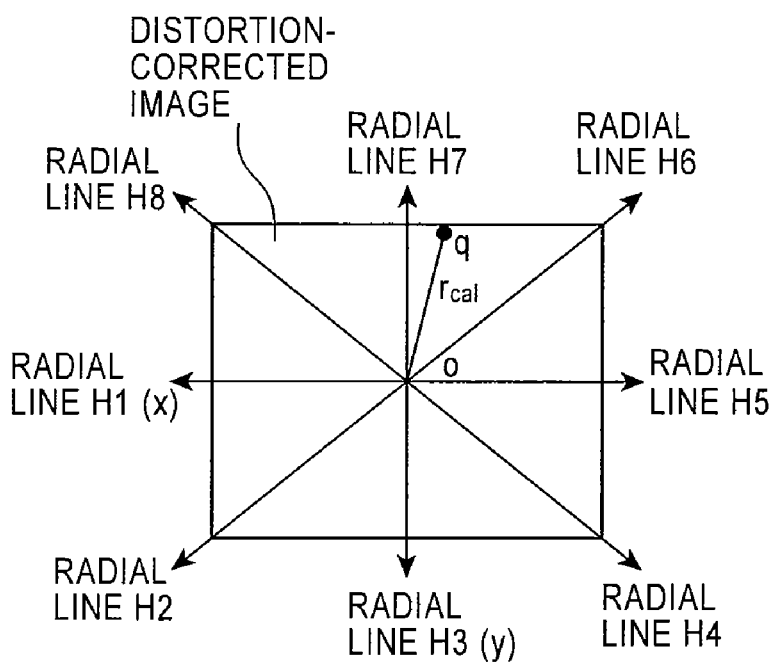

FIG. 17
(a)
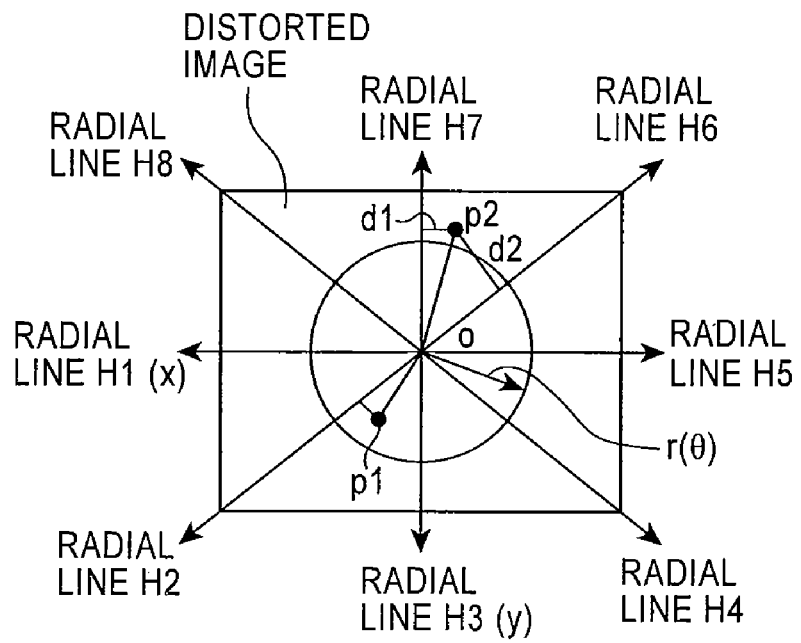
(b)
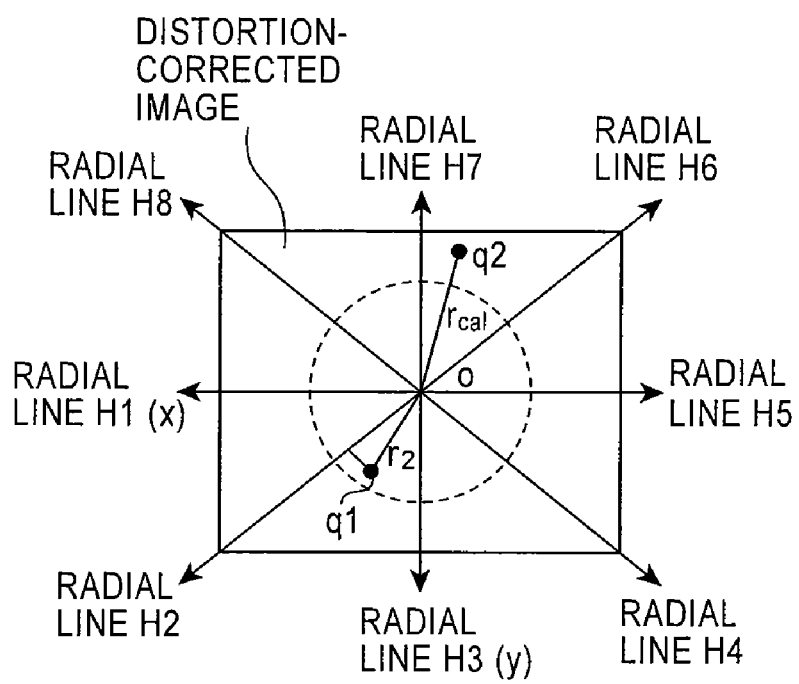

| CORRECTION LEVEL | RADIAL LINE ID | | | | | | | |
|---|---|---|---|---|---|---|---|---|
| | H01 | H02 | H03 | H04 | H05 | H06 | H07 | H08 |
| LOW CORRECTION LEVEL (1) | 0 | 1 | 0 | 1 | 0 | 1 | 0 | 1 |
| HIGH CORRECTION LEVEL (2) | 1 | 1 | 1 | 1 | 1 | 1 | 1 | 1 |

1: SELECTABLE   0: UNSELECTABLE (b)

| CORRECTION LEVEL | REGION ID | | | | | | | |
|---|---|---|---|---|---|---|---|---|
| | R01 | R02 | R03 | R04 | R05 | R06 | R07 | R08 |
| LOW CORRECTION LEVEL (1) | 1 | 0 (R03) | 1 | 0 (R05) | 1 | 0 (R07) | 1 | 0 (R01) |
| HIGH CORRECTION LEVEL (2) | 1 | 1 | 1 | 1 | 1 | 1 | 1 | 1 |

1: SELECTABLE
0: UNSELECTABLE (REGION ID THAT IS ALTERNATIVELY SELECTED)

(c)

| RECEIVED CORRECTION LEVEL | LOW CORRECTION LEVEL (1) |
|---|---|

1: LOW CORRECTION LEVEL   2: HIGH CORRECTION LEVEL

FIG. 21
(a)
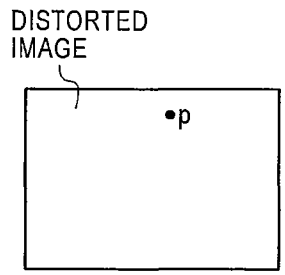
(b)
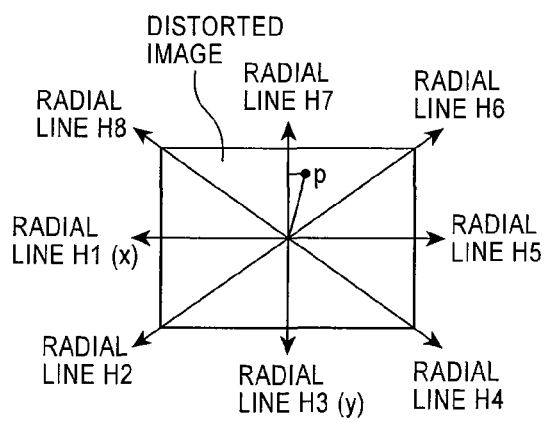
(c)
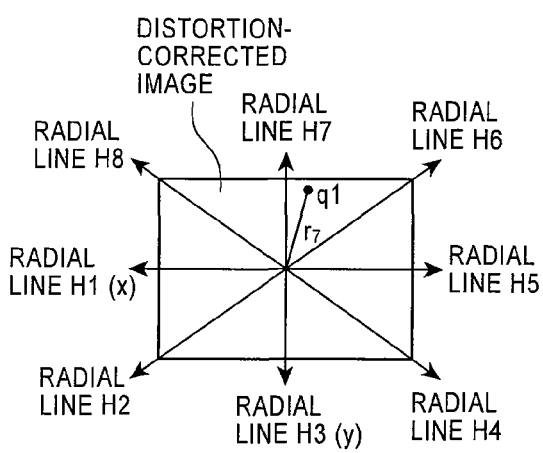
(d)
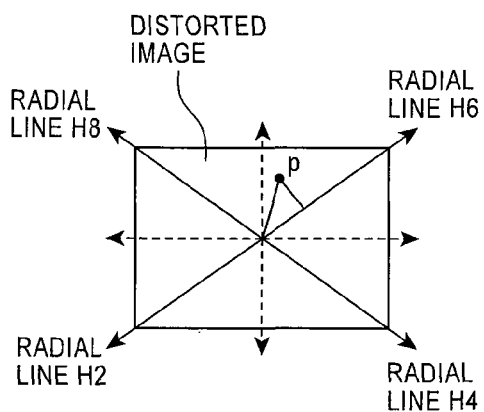
(e)
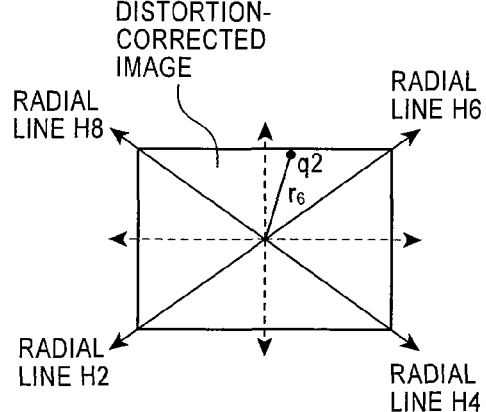

(a)

(b)

$$r(\theta) = k_1\theta + k_2\theta^2 + k_3\theta^3 + k_4\theta^4 + k_5\theta^5$$

DISTORTION-CORRECTED IMAGE GENERATION UNIT AND DISTORTION-CORRECTED IMAGE GENERATION METHOD

BACKGROUND OF THE INVENTION

1. Related Applications

The present application claims priority to Japanese Patent Application Number 2007-313620, filed Dec. 4, 2007, the entirety of which is hereby incorporated by reference.

2. Field of the Invention

The present invention relates to distortion-corrected image generation units and distortion-corrected image generation methods, and in particular, relates to a distortion-corrected image generation unit and a distortion-corrected image generation method suitable for correcting the distortion of an image captured by a fish-eye lens.

3. Description of the Related Art

In general, distortion generated in an image captured using a lens, for example, a fish-eye lens (hereinafter called a distorted image), the focal length of which is short, is corrected using the internal parameters of the used lens. FIG. 23 is a schematic diagram showing known distortion correction. In Part (a) of FIG. 23, reference letters XYZ denote a camera coordinate system (an origin O, an optical axis direction Z, and two directions X and Y on a plane that includes a surface of a lens). A reference letter P denotes the coordinates of an actual object in the camera coordinate system XYZ. Reference letter $\Theta$ denotes an incident angle with respect to the optical axis direction Z in the direction toward the object. A reference letter o denotes an image principal point that is an internal parameter of a camera. A reference letter p denotes a pixel position in a distorted image. A reference letter q denotes a pixel position, corresponding to the pixel position p, in an image obtained by correcting the distortion of the distorted image (hereinafter called a distortion-corrected image). A reference letter r denotes an image height that represents the distance between the pixel position q and the image principal point o. In this case, the lens surface includes the center of the lens and is perpendicular to the optical axis direction Z.

Internal parameters used in the known distortion correction include, for example, the coordinates of the image principal point o and distortion correction parameters k1, k2, k3, k4, and k5 shown in Part (a) of FIG. 23. The distortion correction parameters k1, k2, k3, k4, and k5 are the coefficients of individual orders of an equation of higher degree for defining the image height r in the distortion-corrected image, where the incident angle $\Theta$ is a variable, as shown in Part (b) of FIG. 23. According to the equation of higher degree in Part (b) of FIG. 23, the pixel position p in a distorted image captured at the same incident angle $\Theta$ is corrected to the pixel position q with the same image height r in a distortion-corrected image regardless of the direction from the image principal point o. In other words, the equation of higher degree in Part (b) of FIG. 23 is based on an idea that the degree of distortion generated in a distorted image depends only on the incident angle $\Theta$. In this case, for example, Japanese Patent No. 3286306 discloses an image generation unit that includes a calibration unit in which a lens distortion correction value of a camera is used as a parameter.

However, in practice, the degree of distortion generated in a distorted image does not depend only on the incident angle $\Theta$. Thus, a problem exists in that the distortion of a distorted image cannot be accurately corrected using the equation of higher degree in Part (b) of FIG. 23. When the lens surface is exactly parallel to a surface of an image pickup device of a charge coupled device (CCD) (respective distances between all positions on the image pickup device surface and the lens surface are the same as a predetermined distance (a predetermined gap width)), the degree of distortion generated in a distorted image depends only on the incident angle $\Theta$. However, in practice, the lens surface is not exactly parallel to the image pickup device surface due to manufacturing tolerances, thereby resulting in such a problem.

When the lens surface is parallel to the image pickup device surface, respective distances between all positions on the image pickup device surface and the lens surface are the same as the predetermined distance, as described above. However, when the lens surface is not parallel to the image pickup device surface, errors with respect to the predetermined distance occur at all positions, except a certain position or any position on a certain straight line, on the image pickup device surface. Moreover, the error magnitude varies with the position on the image pickup device surface and is maximized at the edge of the image pickup device surface. Moreover, the larger the error magnitude, the lower the accuracy of distortion correction. Thus, a significant problem is that distortion cannot be accurately corrected at the edge of a distorted image in which distortion is likely to occur and needs to be accurately corrected.

In view of the aforementioned problems, it is an object of the present invention to accurately correct the distortion of a distorted image even when a surface of a lens is not exactly parallel to a surface of an image pickup device due to manufacturing tolerances.

SUMMARY OF THE INVENTION

To solve the aforementioned problems, in the present invention, a plurality of sets of internal parameters each of which is to be applied to correct a pixel position in a direction from an image principal point, i.e., a plurality of sets of internal parameters for accommodating errors of different magnitudes that occur in individual directions from an image principal point, are stored in advance. On the basis of the direction of a pixel position to be corrected from the image principal point, a set of internal parameters to be applied to correct the pixel position to be corrected is selected from the plurality of sets of internal parameters stored in advance, and distortion is corrected on the basis of the selected set of internal parameters.

Thus, in the present invention, even when a surface of a lens is not exactly parallel to a surface of an image pickup device due to manufacturing tolerances, the distortion of a distorted image can be corrected more accurately.

BRIEF DESCRIPTION OF THE DRAWINGS

FIGS. 2A and 2B show exemplary internal parameters stored in internal parameter storage units according to first to fifth embodiments;

FIG. 3 illustrates the internal parameters stored in the internal parameter storage units according to the first to fifth embodiments;

FIG. 4 illustrates the internal parameters stored in the internal parameter storage units according to the first to fifth embodiments;

FIG. 6 shows the relationship between a pixel position and internal parameters to be applied in the first embodiment;

FIG. 7 shows the relationship between a pixel position and internal parameters to be applied in the first embodiment;

FIG. 10 shows the relationship between a pixel position and internal parameters to be applied in the second embodiment;

FIG. 14 shows the relationship between a pixel position and internal parameters to be applied in the third embodiment;

FIG. 17 shows the relationship between pixel positions and internal parameters to be applied in the fourth embodiment;

FIG. 19 shows exemplary information stored in a selectability information storage unit and a correction level storage unit according to the fifth embodiment;

FIG. 21 shows the relationship between a pixel position and internal parameters to be applied in the fifth embodiment;

DESCRIPTION OF THE PREFERRED EMBODIMENTS

Figure 1:
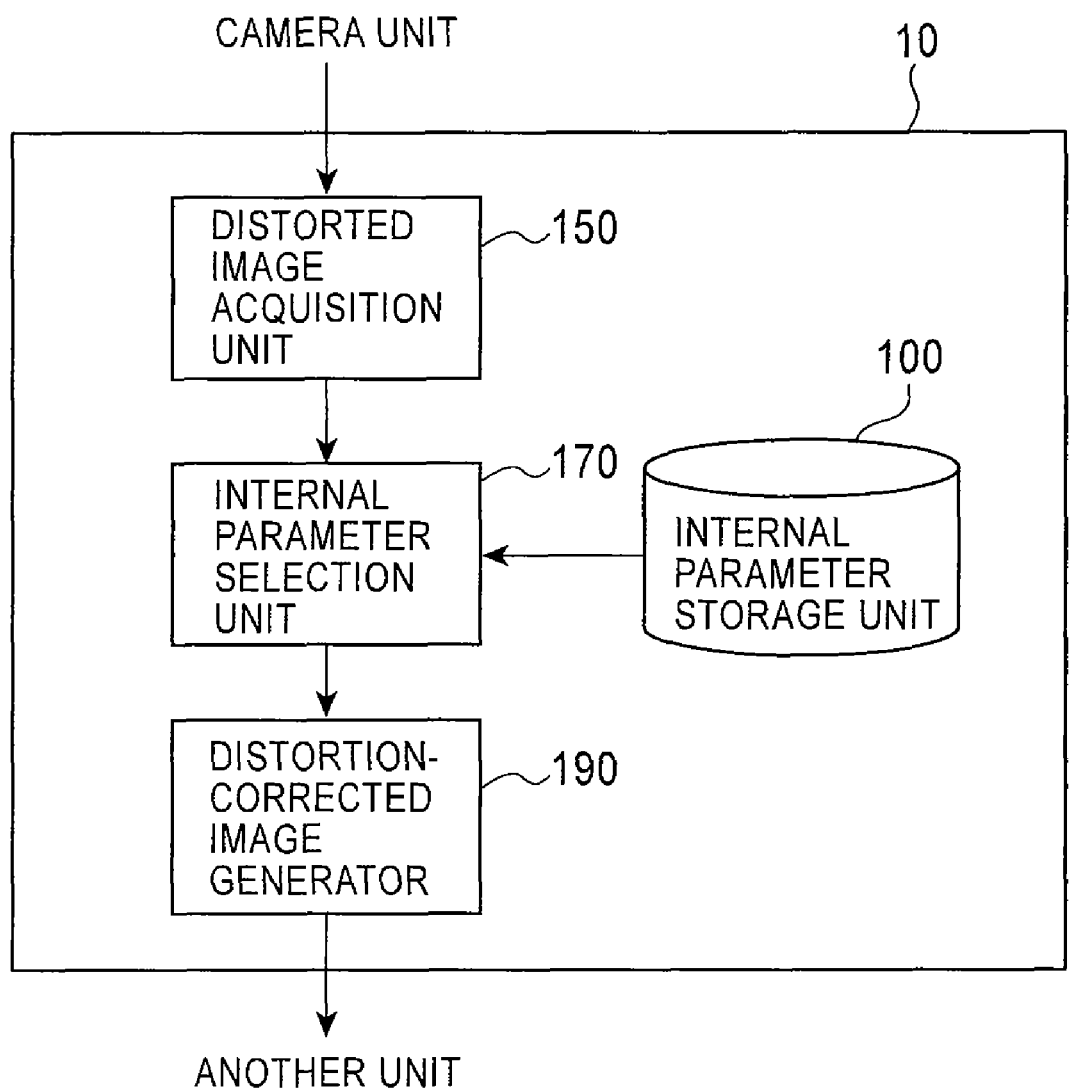
FIG. 1 shows exemplary components of a distortion-corrected image generation unit according to a first embodiment of the present invention.
Figure 23:
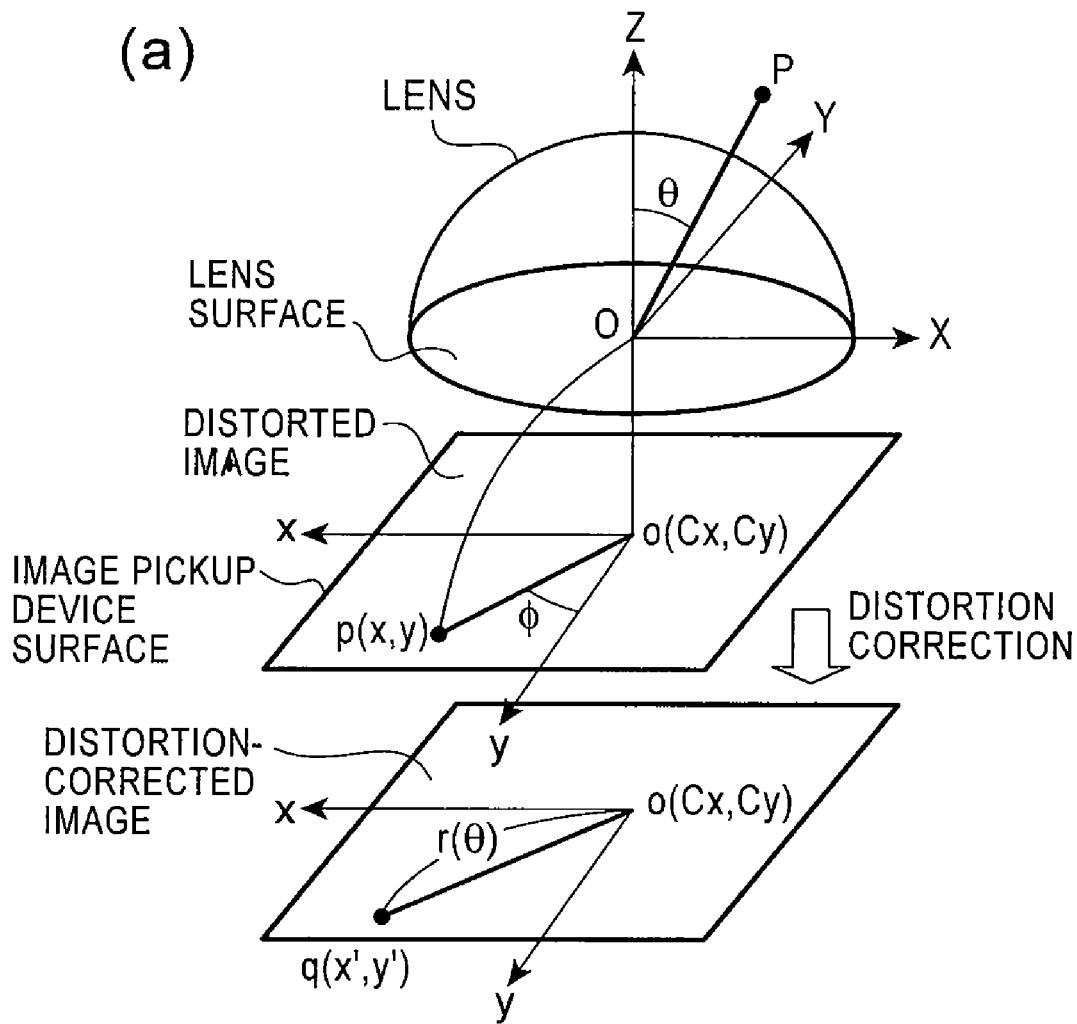
FIG. 23 is a schematic diagram showing known distortion correction.

A first embodiment of the present invention will now be described with reference to the drawings. FIG. 1 shows exemplary components of a distortion-corrected image generation unit 10 according to the first embodiment of the present invention. FIGS. 2A and 2B show exemplary internal parameters stored in an internal parameter storage unit 100. FIGS. 3 and 4 illustrate the internal parameters stored in the internal parameter storage unit 100. In Part (a) of FIG. 3, reference letter R denotes the intersection of the XY plane and a vertical line that extends from a point Q on a line OP. Reference letter Φ denotes the angle between a line OY and a line OR. Reference letters XYZ, P, Θ, o, q, r denote the same components as in Part (a) of FIG. 23.

The distortion-corrected image generation unit 10 generates a distortion-corrected image by correcting the distortion of a distorted image captured using a fish-eye lens (the same applies to distortion-corrected image generation units 20, 30, 40, and 50 described below). The distortion-corrected image generation unit 10 includes the internal parameter storage unit 100, a distorted image acquisition unit 150, an internal parameter selection unit 170, and a distortion-corrected image generator 190, as shown in FIG. 1.

The internal parameter storage unit 100 stores a plurality of sets of internal parameters, related to a fish-eye lens, each of the sets to be applied to correct a pixel position in a direction from the image principal point of a distorted image (a plurality of sets of internal parameters for accommodating errors of different magnitudes that occur in individual directions). Specifically, the internal parameter storage unit 100 stores eight sets of internal parameters, as shown in FIG. 2A. Each of the eight sets of internal parameters is associated with a radial line identification (ID) (corresponding to radial line identification information in the present invention) and includes a first coefficient, a second coefficient, a third coefficient, a fourth coefficient, and a fifth coefficient. The internal parameter storage unit 100 further stores information for defining each radial line (hereinafter called radial line information) in association with a corresponding radial line ID, as shown in FIG. 2A. Radial line information includes, for example, coordinate information and a linear function.

Radial line IDs identify a plurality of radial lines H1, H2, H3, H4, H5, H6, H7, and H8 that radially extend from the image principal point o and divide the region of the distorted image, as shown in Part (b) of FIG. 3 in which the distorted image shown in Part (a) of FIG. 3 is viewed from the optical axis direction Z. That is to say, the internal parameter storage unit 100 stores eight sets of internal parameters each of which includes first to fifth coefficients related to a corresponding one of the radial lines H1 to H8 extending in eight directions.

A set of internal parameters stored in association with a radial line ID "H01" shown in FIG. 2A (a set of a first coefficient $k_{11}$, a second coefficient $k_{15}$) a third coefficient $k_{13}$, a fourth coefficient $k_{14}$, and a fifth coefficient $k_{15}$) is applied to correct a pixel position in the direction of the radial line H1 identified by the radial line ID "H01". In an equation of higher degree (for defining the image height r in the distortion-corrected image, where the incident angle Θ is a variable) to be applied to correct a pixel position in the direction of the radial line H1 shown in Part (a) of FIG. 4, the first coefficient $k_{11}$ is the linear coefficient of the incident angle Θ, the second coefficient $k_{12}$ is the quadratic coefficient of the incident angle Θ, the third coefficient $k_{13}$ is the tertiary coefficient of the incident angle Θ, the fourth coefficient $k_{14}$ is the biquadratic coefficient of the incident angle Θ, and the fifth coefficient $k_{15}$ is the quintic coefficient of the incident angle Θ.

Similarly, a set of internal parameters stored in association with a radial line ID "H02" shown in FIG. 2A (a set of a first coefficient $k_{21}$, a second coefficient $k_{22}$, a third coefficient $k_{23}$, a fourth coefficient $k_{24}$, and a fifth coefficient $k_{25}$) is applied to correct a pixel position in the direction of the radial line H2 identified by the radial line ID "H02". In an equation of higher degree to be applied to correct a pixel position in the direction of the radial line H2 shown in Part (b) of FIG. 4, the first coefficient $k_{21}$ is the linear coefficient of the incident angle Θ, the second coefficient $k_{22}$ is the quadratic coefficient of the incident angle Θ, the third coefficient $k_{23}$ is the tertiary coefficient of the incident angle Θ, the fourth coefficient $k_{24}$ is the biquadratic coefficient of the incident angle Θ, and the fifth coefficient $k_{25}$ is the quintic coefficient of the incident angle Θ. The same applies to a set of internal parameters stored in association with each of the radial line IDs "H03" to "H08".

Alternatively, the internal parameter storage unit 100 may store eight sets of internal parameters in association with region IDs (corresponding to region identification information in the present invention) instead of radial line IDs, as shown in FIG. 2B. In this case, the internal parameter storage unit 100 further stores information for defining each divided region (hereinafter called divided region information) in association with a corresponding region ID, as shown in FIG. 2B. Divided region information includes, for example, coordinate information.

Region IDs identify a plurality of divided regions R1, R2, R3, R4, R5, R6, R7, and R8 into which the region of the distorted image is divided and that radially extend from the image principal point o, as shown in Part (c) of FIG. 3 in which the distorted image shown in Part (a) of FIG. 3 is viewed from the optical axis direction Z. That is to say, the internal parameter storage unit 100 stores eight sets of internal parameters each of which includes first to fifth coefficients related to a corresponding one of the divided regions R1 to R8, which extend from the image principal point o in eight directions.

The distorted image acquisition unit 150 obtains a distorted image from a camera unit. Alternatively, the distorted image acquisition unit 150 may obtain a distorted image from another unit, for example, a storage memory, instead of the camera unit. The distorted image acquisition unit 150 supplies the obtained distorted image to the internal parameter selection unit 170.

The internal parameter selection unit 170 obtains the distorted image from the distorted image acquisition unit 150. The internal parameter selection unit 170 determines a pixel position to be corrected in the obtained distorted image. The internal parameter selection unit 170 selects, on the basis of the direction of the determined pixel position to be corrected from the image principal point o, one set of internal parameters to be applied to correct the pixel position to be corrected from eight sets of internal parameters stored in the internal parameter storage unit 100.

Specifically, when eight sets of internal parameters are stored in the internal parameter storage unit 100 in association with radial line IDs, as shown in FIG. 2A, the internal parameter selection unit 170 selects, as a set of internal parameters to be applied to correct the pixel position to be corrected, one set of internal parameters associated with a radial line ID identifying a radial line, the distance between the radial line and the pixel position to be corrected being shortest, from the eight sets of internal parameters stored in the internal parameter storage unit 100. For example, in a case where the pixel position p in Part (b) of FIG. 3 is to be corrected, the internal parameter selection unit 170 selects the set of internal parameters associated with a radial line ID "H02" identifying the radial line H2, the distance between the radial line H2 and the pixel position p being shortest.

On the other hand, when eight sets of internal parameters are stored in the internal parameter storage unit 100 in association with region IDs, as shown in FIG. 2B, the internal parameter selection unit 170 selects, as a set of internal parameters to be applied to correct the pixel position to be corrected, one set of internal parameters associated with a region ID identifying a divided region that includes the pixel position to be corrected. For example, in a case where the pixel position p in the distorted image shown in Part (c) of FIG. 3 is to be corrected, the internal parameter selection unit 170 selects the set of internal parameters associated with a region ID "R02" for identifying the divided region R2, which includes the pixel position p.

When the internal parameter selection unit 170 selects the set of internal parameters to be applied to correct a pixel position to be corrected, the distortion-corrected image generator 190 generates a distortion-corrected image from a distorted image by replacing a pixel value at the pixel position to be corrected with a pixel value at another pixel position on the basis of the selected set of internal parameters.

In particular, when the internal parameter selection unit 170 selects one set of internal parameters, the distortion-corrected image generator 190 first obtains circular polar coordinates $(r_0, \Phi)$ and the incident angle Θ from rectangular coordinates (x, y) about the pixel position p to be corrected in the distorted image. In this case, the relationship between an image height $r_0$ and the incident angle Θ is known. Then, the distortion-corrected image generator 190 substitutes the selected set of internal parameters and the incident angle Θ in a corresponding one of the equations of higher degree shown in FIG. 4 to calculate the image height r of the pixel position q in the distortion-corrected image. Then, the distortion-corrected image generator 190 obtains rectangular coordinates (x', y') from circular polar coordinates (r, Φ) about the pixel position q in the distortion-corrected image. Then, the distortion-corrected image generator 190 generates the distortion-corrected image from the distorted image by replacing a pixel value at the pixel position p (the coordinates (x, y)) to be corrected in the distorted image with a pixel value at the other pixel position q (the coordinates (x', y')). The distortion-corrected image generator 190 supplies the generated distortion-corrected image to an external unit.

Figure 5:
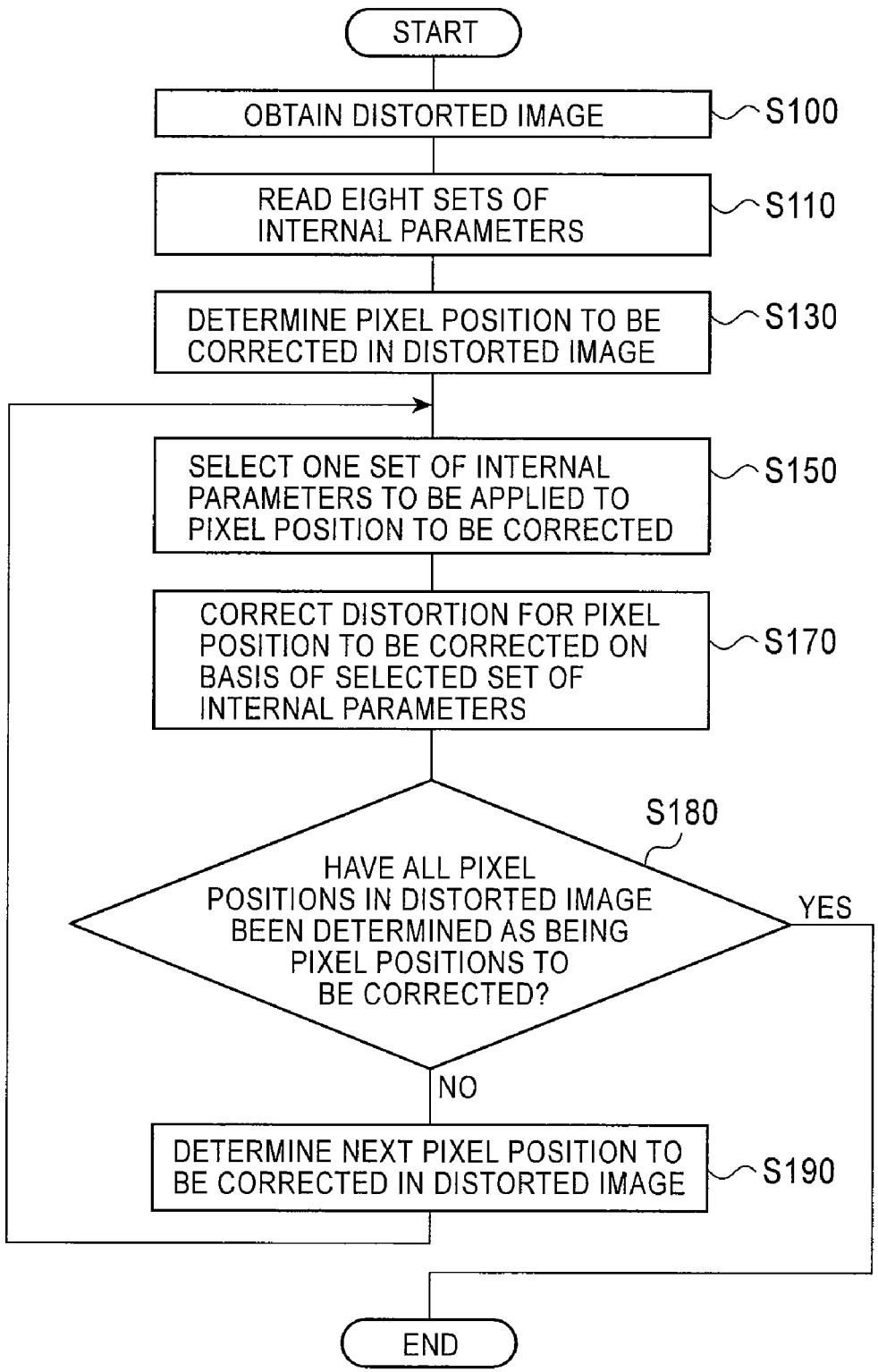
FIG. 5 is a flowchart showing an exemplary operation of the distortion-corrected image generation unit shown in FIG. 1.

The operation of the distortion-corrected image generation unit 10 will now be described. FIG. 5 is a flowchart showing an exemplary operation of the distortion-corrected image generation unit 10 shown in FIG. 1. FIGS. 6 and 7 show the relationship between a pixel position and internal parameters to be applied. In this case, it is assumed that the information shown in FIG. 2A is stored in the internal parameter storage unit 100 before the start of the flowchart shown in FIG. 5.

In step S100, the distorted image acquisition unit 150 obtains a distorted image, e.g., from the camera unit. Then, the distorted image acquisition unit 150 supplies the obtained distorted image to the internal parameter selection unit 170.

In step S110, the internal parameter selection unit 170 reads the eight sets of internal parameters and the radial line information stored in the internal parameter storage unit 100 in association with the radial line IDs. Then, in step S130, the internal parameter selection unit 170 determines a pixel position to be corrected in the distorted image. For example, the internal parameter selection unit 170 determines the upper left corner of the distorted image as being a pixel position to be corrected.

In step S150, the internal parameter selection unit 170 selects one set of internal parameters to be applied to correct the pixel position to be corrected determined in step S130 from the eight sets of internal parameters read in step S110. Specifically, the internal parameter selection unit 170 selects one set of internal parameters associated with a radial line ID identifying a radial line, the distance between the radial line and the pixel position to be corrected being shortest.

For example, when the pixel position p in the distorted image shown in Part (a) of FIG. 6 is to be corrected, the internal parameter selection unit 170 selects the set of internal parameters associated with radial line identification information "H07" identifying the radial line H7, the distance between the radial line H7 and the pixel position p being shortest. The internal parameter selection unit 170 supplies, to the distortion-corrected image generator 190, the pixel position to be corrected determined in step S130 and the set of internal parameters selected in step S150.

The distortion-corrected image generator 190 obtains, from the internal parameter selection unit 170, the pixel position to be corrected and the set of internal parameters to be applied to correct the pixel position to be corrected. In step S170, the distortion-corrected image generator 190 generates a distortion-corrected image from the distorted image by replacing a pixel value at the pixel position to be corrected with a pixel value at another pixel position on the basis of the set of internal parameters.

For example, when the distortion-corrected image generator 190 obtains, from the internal parameter selection unit 170, the pixel position p in the distorted image shown in Part (a) of FIG. 6 as a pixel position to be corrected and one set of internal parameters (a set of a first coefficient $k_{71}$, a second coefficient $k_{72}$, a third coefficient $k_{73}$, a fourth coefficient $k_{74}$, and a fifth coefficient $k_{75}$) to be applied to correct the pixel position p, the distortion-corrected image generator 190 first substitutes the set of internal parameters and the incident angle $\Theta$ in an equation of higher degree shown in Part (g) of FIG. 4 to calculate the image height $r_7$ of the pixel position in the distortion-corrected image. In this case, the incident angle $\Theta$ is obtained (calculated) from the coordinates (x, y) of the pixel position p.

Then, the distortion-corrected image generator 190 generates the distortion-corrected image shown in Part (b) of FIG. 6 from the distorted image shown in Part (a) of FIG. 6 by replacing a pixel value at the pixel position p in the distorted image shown in Part (a) of FIG. 6 with a pixel value at the pixel position q (the coordinates (x', y')) in the distortion-corrected image shown in Part (b) of FIG. 6. In this case, the coordinates (x', y') are obtained (calculated) from coordinates $(r_7, \Phi)$, and an angle $\Theta$ is obtained (calculated) from the coordinates (x, y).

Then, in step S180, the internal parameter selection unit 170 determines whether all pixel positions in the distorted image have been determined as being pixel positions to be corrected. When the internal parameter selection unit 170 determines that all the pixel positions in the distorted image have not been determined as being pixel positions to be corrected, the process proceeds to step S190. In step S190, the internal parameter selection unit 170 determines the next pixel position to be corrected in the distorted image, and the process returns to step S150. On the other hand, when the internal parameter selection unit 170 determines that all the pixel positions in the distorted image have been determined as being pixel positions to be corrected, the process is completed.

In this case, when the information shown in FIG. 2B is stored in the internal parameter storage unit 100, in step S150, the internal parameter selection unit 170 selects the set of internal parameters associated with a region ID identifying a divided region that includes the pixel position to be corrected.

For example, when the pixel position p in the distorted image shown in Part (a) of FIG. 7 is to be corrected, the internal parameter selection unit 170 selects the set of internal parameters associated with a region ID "R07" identifying the divided region R7, which includes the pixel position p. The distortion-corrected image generator 190 generates the distortion-corrected image shown in Part (b) of FIG. 7 from the distorted image shown in Part (a) of FIG. 7.

Figure 8:
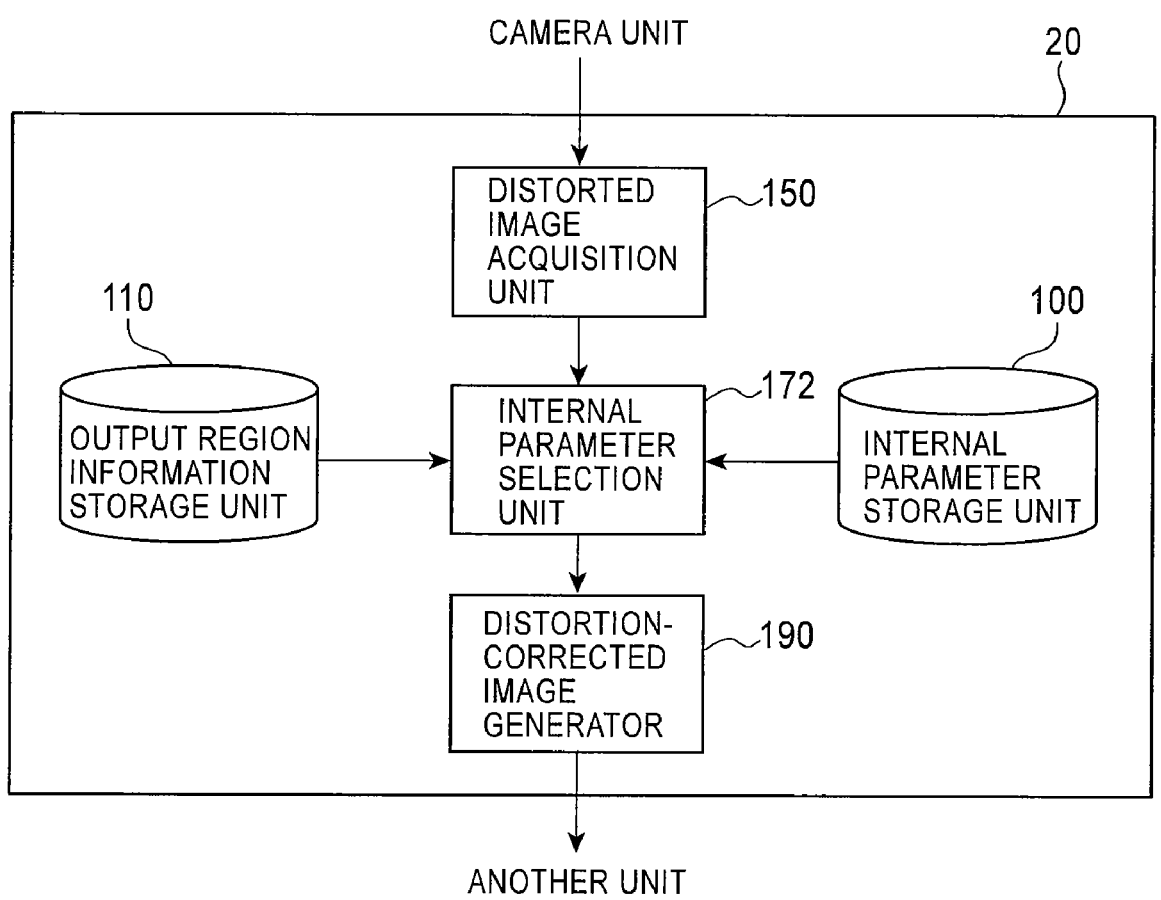
FIG. 8 shows exemplary components of a distortion-corrected image generation unit according to a second embodiment of the present invention.

A second embodiment of the present invention will now be described with reference to the drawings. FIG. 8 shows exemplary components of a distortion-corrected image generation unit 20 according to the second embodiment of the present invention. The distortion-corrected image generation unit 20 includes the internal parameter storage unit 100, an output region information storage unit 110, the distorted image acquisition unit 150, an internal parameter selection unit 172, and the distortion-corrected image generator 190. Since the functions of the internal parameter storage unit 100, the distorted image acquisition unit 150, and the distortion-corrected image generator 190 are the same as those of individual blocks with the same reference numerals in the distortion-corrected image generation unit 10 shown in FIG. 1, the description of these functions is omitted.

The output region information storage unit 110 stores output region information that represents an output region to be externally output, out of regions of a distorted image. An output region represents a region that is actually needed by another unit related to the subsequent process, out of all regions of a distorted image. For example, an output region is a region to be stored in a storage unit that is another unit, a region to be subjected to image processing in an image processing unit that is another unit, or a region to be displayed in a display unit that is another unit. Output region information includes, for example, coordinate information.

The internal parameter selection unit 172 obtains a distorted image from the distorted image acquisition unit 150. The internal parameter selection unit 172 refers to output region information stored in the output region information storage unit 110 and determines, as a pixel position to be corrected, a pixel position in an output region indicated by the output region information in the distorted image. The internal parameter selection unit 172 selects, on the basis of the direction of the determined pixel position to be corrected from the image principal point o, one set of internal parameters to be applied to correct the pixel position to be corrected from the eight sets of internal parameters stored in the internal parameter storage unit 100.

Figure 9:
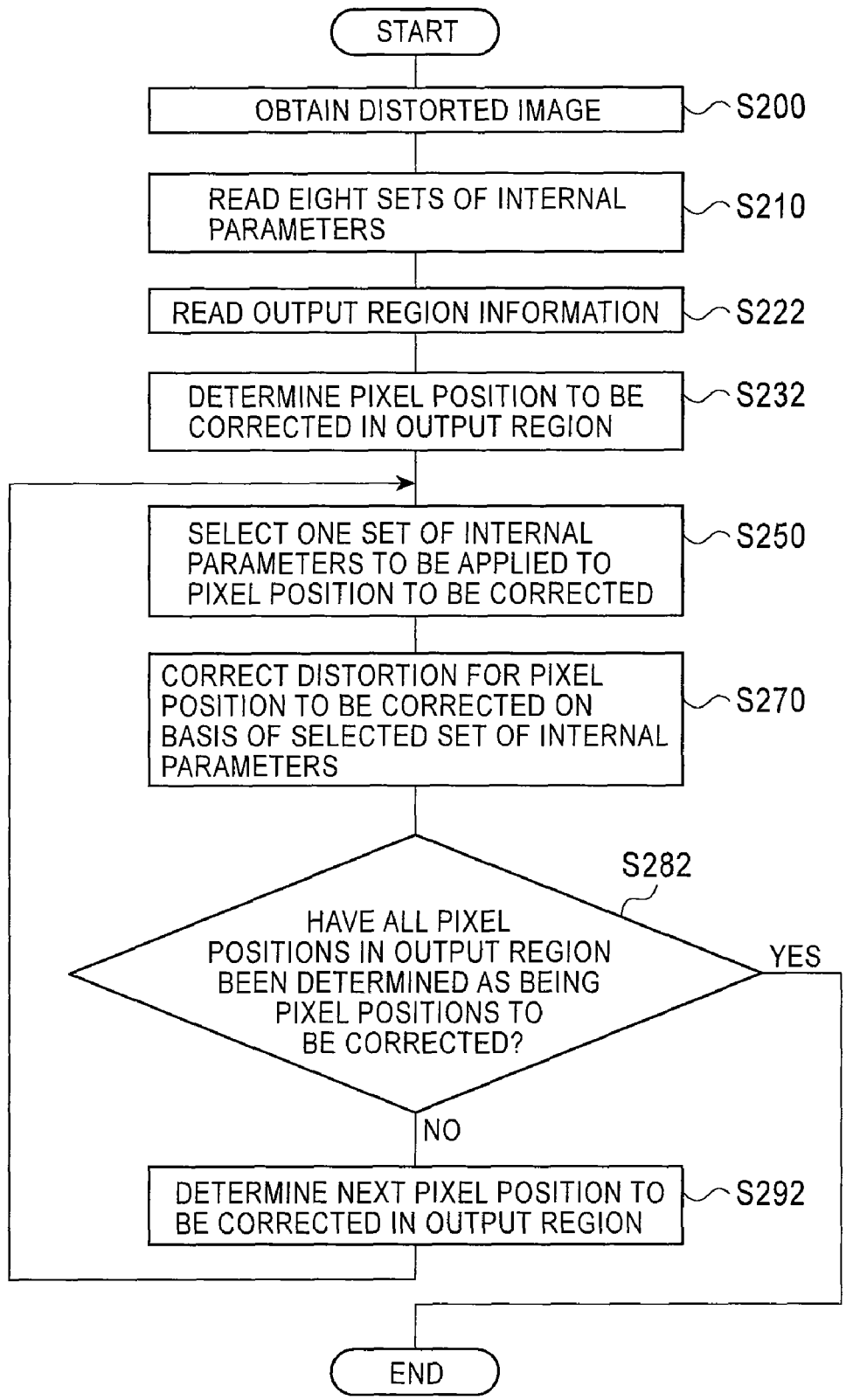
FIG. 9 is a flowchart showing an exemplary operation of the distortion-corrected image generation unit shown in FIG. 8.

The operation of the distortion-corrected image generation unit 20 will now be described. FIG. 9 is a flowchart showing an exemplary operation of the distortion-corrected image generation unit 20 shown in FIG. 8. FIG. 10 shows the relationship between a pixel position and internal parameters to be applied. Since the process in steps S200, S210, S250, and S270 is the same as that in steps S100, S110, S150, and S170 shown in FIG. 5, the description of these steps is omitted.

After step S210, in step S222, the internal parameter selection unit 172 reads output region information stored in the output region information storage unit 110. Then, in step S232, the internal parameter selection unit 172 determines a pixel position in an output region indicated by the output region information as being a pixel position to be corrected. For example, the internal parameter selection unit 172 determines the upper left corner of the output region as being a pixel position to be corrected.

After step S270, in step S282, the internal parameter selection unit 172 determines whether all pixel positions in the output region have been determined as being pixel positions to be corrected. When the internal parameter selection unit 172 determines that all the pixel positions in the output region have not been determined as being pixel positions to be corrected, the process proceeds to step S292. In step S292, the internal parameter selection unit 172 determines the next pixel position to be corrected in the output region, and the process returns to step S250. On the other hand, when the internal parameter selection unit 172 determines that all the pixel positions in the output region have been determined as being pixel positions to be corrected, the process is completed.

When the pixel position p in an output region shown in Part (a) of FIG. 10 is to be corrected, in step S270, the distortion-corrected image generator 190 generates a distortion-corrected image shown in Part (b) of FIG. 10 from a distorted image shown in Part (a) of FIG. 10 by replacing a pixel value at the pixel position p in the output region in the distorted image shown in Part (a) of FIG. 10 with a pixel value at the pixel position q in the distortion-corrected image shown in Part (b) of FIG. 10.

Figure 11:
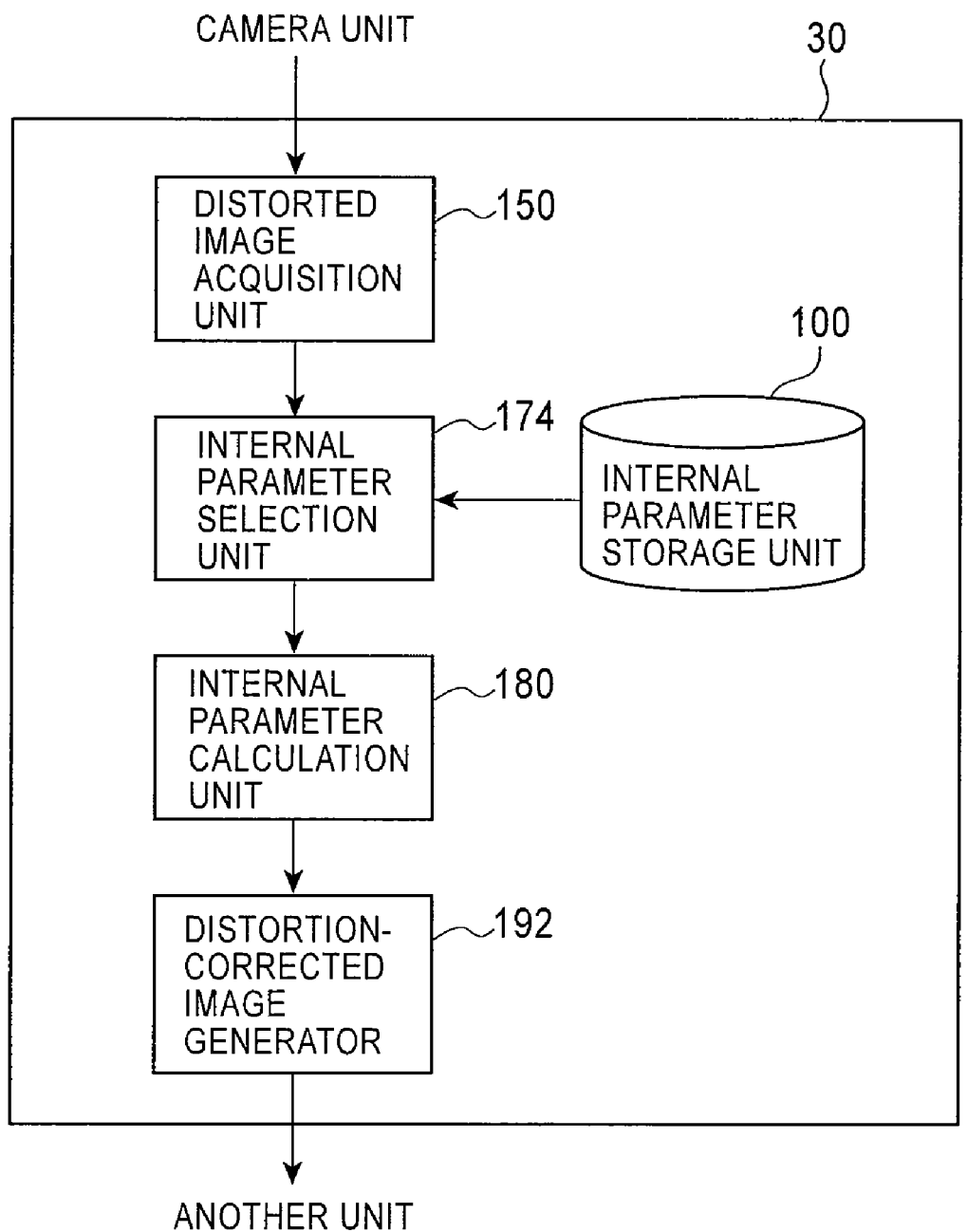
FIG. 11 shows exemplary components of a distortion-corrected image generation unit according to a third embodiment of the present invention.
Figure 12:
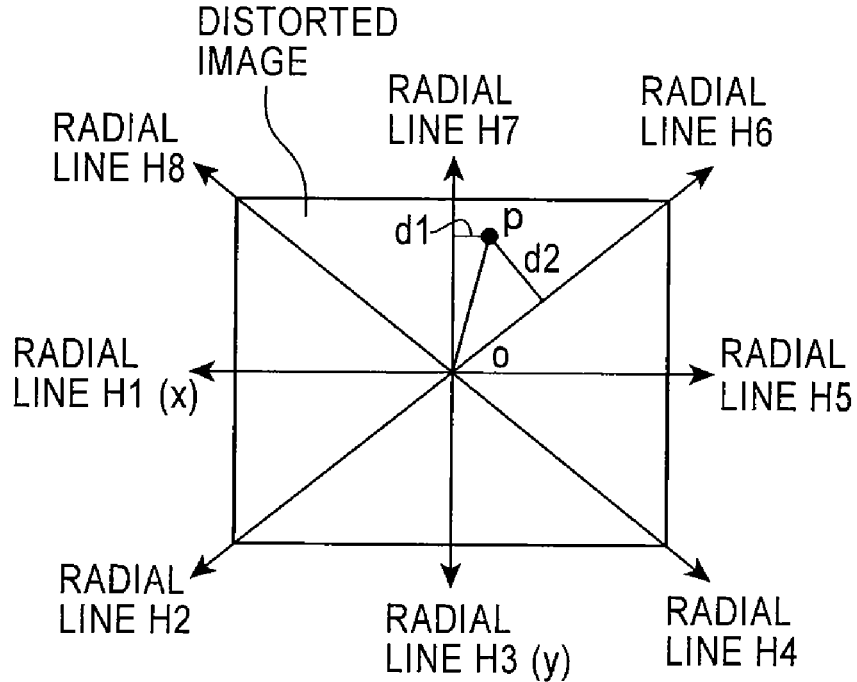
FIG. 12 shows the relationship between a pixel position and internal parameters to be applied in the third embodiment.

A third embodiment of the present invention will now be described with reference to the drawings. FIG. 11 shows exemplary components of a distortion-corrected image generation unit 30 according to the third embodiment of the present invention. FIG. 12 shows the relationship between a pixel position and internal parameters to be applied. The distortion-corrected image generation unit 30 includes the internal parameter storage unit 100, the distorted image acquisition unit 150, an internal parameter selection unit 174, an internal parameter calculation unit 180, and a distortion-corrected image generator 192. Since the functions of the internal parameter storage unit 100 and the distorted image acquisition unit 150 are the same as those of individual blocks with the same reference numerals in the distortion-corrected image generation unit 10 shown in FIG. 1, the description of the functions is omitted. In this case, the internal parameter storage unit 100 stores the information shown in FIG. 2A.

The internal parameter selection unit 174 obtains a distorted image from the distorted image acquisition unit 150. The internal parameter selection unit 174 determines a pixel position to be corrected in the obtained distorted image. The internal parameter selection unit 174 selects, on the basis of the direction of the determined pixel position to be corrected from the image principal point o, two sets of internal parameters to be applied to correct the pixel position to be corrected from the eight sets of internal parameters stored in the internal parameter storage unit 100.

Specifically, the internal parameter selection unit 174 selects, as the two sets of internal parameters, a set of internal parameters (corresponding to a first set of internal parameters in the present invention) associated with a radial line ID identifying a radial line, the distance between the radial line and the pixel position to be corrected being shortest, and a set of internal parameters (corresponding to a second set of internal parameters in the present invention) associated with a radial line ID identifying a radial line, the distance between the radial line and the pixel position to be corrected being second shortest.

For example, when the pixel position p in Part (a) of FIG. 12 is to be corrected, the internal parameter selection unit 174 selects, as two sets of internal parameters to be applied to correct the pixel position p, one set of internal parameters associated with the radial line ID "H07" identifying the radial line H7, the distance between the radial line H7 and the pixel position p being shortest, and another set of internal parameters associated with a radial line ID "H06" identifying the radial line H6, the distance between the radial line H6 and the pixel position p being second shortest.

The internal parameter calculation unit 180 calculates a new set of internal parameters by obtaining a weighted average of each pair of corresponding coefficients in the two sets of internal parameters selected by the internal parameter selection unit 174.

For example, in a case where the pixel position p in Part (a) of FIG. 12 is to be corrected, when the internal parameter selection unit 174 selects the one set of internal parameters (the set of the first coefficient $k_{71}$, the second coefficient $k_{72}$, the third coefficient $k_{73}$, the fourth coefficient $k_{74}$, and the fifth coefficient $k_{75}$) associated with the radial line ID "H07" and the other set of internal parameters (a set of a first coefficient $k_{61}$, a second coefficient $k_{62}$, a third coefficient $k_{63}$, a fourth coefficient $k_{64}$, and a fifth coefficient $k_{65}$) associated with the radial line ID "H06", the internal parameter calculation unit 180 calculates a new set of internal parameters (a set of a first coefficient $k_1$, a second coefficient $k_2$, a third coefficient $k_3$, a fourth coefficient $k_4$, and a fifth coefficient $k_5$) by obtaining a weighted average of each pair of corresponding coefficients in the two sets of internal parameters as shown in Parts (b) to (f) of FIG. 12. In Parts (a) to (f) of FIG. 12, reference letters d1 and d2 denote the distance between the radial line H7 and the pixel position p and the distance between the radial line H6 and the pixel position p, respectively.

The distortion-corrected image generator 192 generates a distortion-corrected image from the distorted image by replacing a pixel value at the pixel position to be corrected with a pixel value at another pixel position on the basis of the new set of internal parameters calculated by the internal parameter calculation unit 180.

For example, when the internal parameter calculation unit 180 calculates the new set of internal parameters shown in Parts (b) to (f) of FIG. 12 to be applied to correct the pixel position p, the distortion-corrected image generator 192 replaces a pixel value at the pixel position p with a pixel value at another pixel position by calculating the image height $r_{cal}$ of a pixel position in the distortion-corrected image by substituting the new set of internal parameters shown in Parts (b) to (f) of FIG. 12 and the incident angle Θ in an equation of higher degree shown in Part (g) of FIG. 12.

Figure 13:
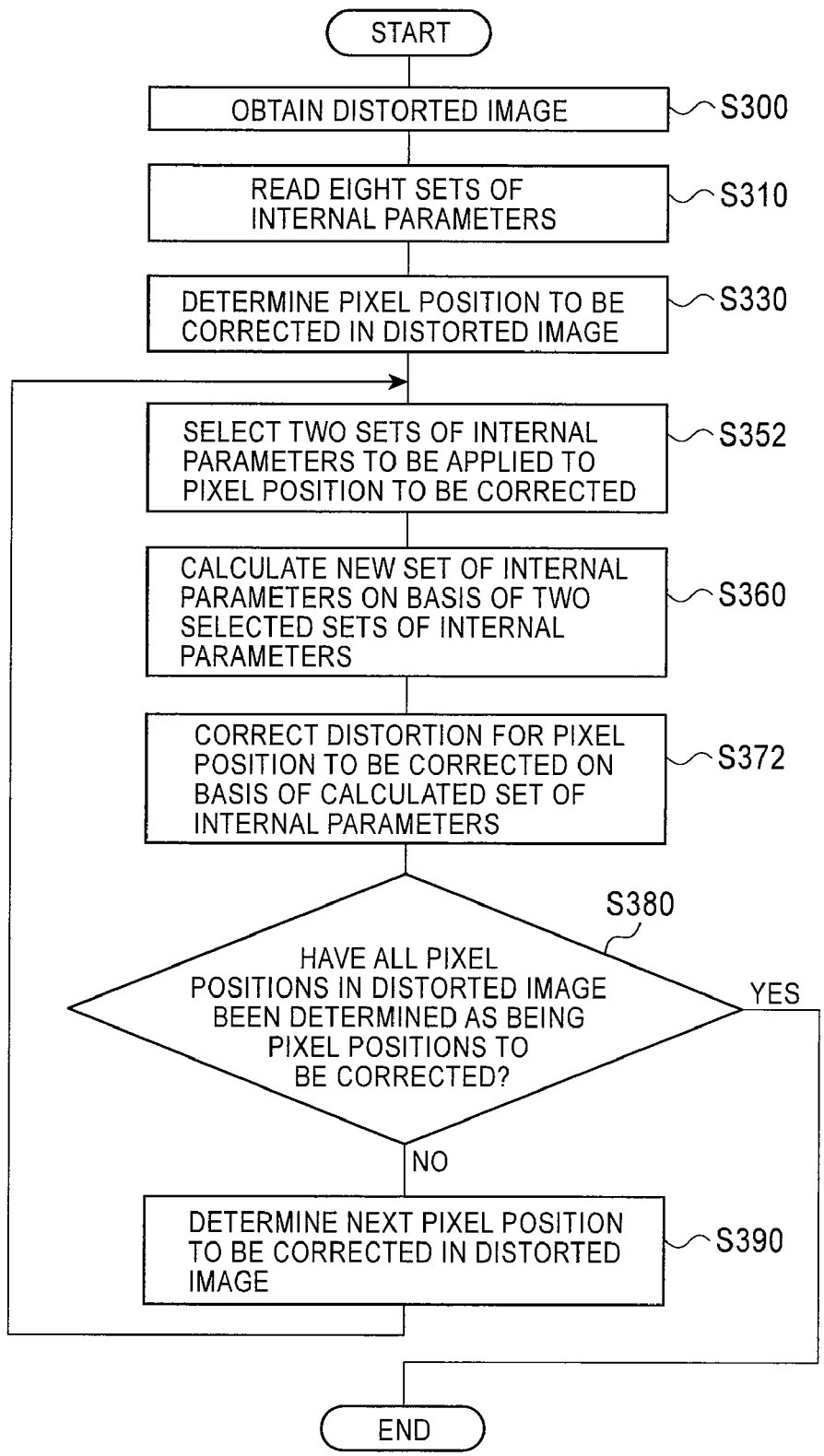
FIG. 13 is a flowchart showing an exemplary operation of the distortion-corrected image generation unit shown in FIG. 11.

The operation of the distortion-corrected image generation unit 30 will now be described. FIG. 13 is a flowchart showing an exemplary operation of the distortion-corrected image generation unit 30 shown in FIG. 11. FIG. 14 shows the relationship between a pixel position and internal parameters to be applied. Since the process in steps S300, S310, S330, S380, and S390 is the same as that in steps S100, S110, S130, S180, and S190 shown in FIG. 5, the description of these steps is omitted.

After step S330, in step S352, the internal parameter selection unit 174 selects two sets of internal parameters from the eight sets of internal parameters read in step S310. Specifically, the internal parameter selection unit 174 selects a set of internal parameters associated with a radial line ID identifying a radial line, the distance between the radial line and a pixel position to be corrected being shortest, and a set of internal parameters associated with a radial line ID identifying a radial line, the distance between the radial line and the pixel position to be corrected being second shortest.

For example, when the pixel position p in Part (a) of FIG. 14 is to be corrected, the internal parameter selection unit 174 selects, as two sets of internal parameters to be applied to correct the pixel position p, one set of internal parameters associated with the radial line ID "H07" identifying the radial line H7, the distance between the radial line H7 and the pixel position p being shortest, and another set of internal parameters associated with a radial line ID "H06" identifying the radial line H6, the distance between the radial line H6 and the pixel position p being second shortest.

The internal parameter selection unit 174 supplies, to the internal parameter calculation unit 180, the pixel position to be corrected determined in step S330 and the two sets of internal parameters selected in step S352. The internal parameter calculation unit 180 obtains the pixel position to be corrected and the two sets of internal parameters from the internal parameter selection unit 174. In step S360, the internal parameter calculation unit 180 calculates a new set of internal parameters by obtaining a weighted average of each pair of corresponding coefficients in the two sets of internal parameters.

For example, in a case where the pixel position p in Part (a) of FIG. 14 is to be corrected, when the internal parameter selection unit 174 selects the one set of internal parameters (the set of the first coefficient $k_{71}$, the second coefficient $k_{72}$, the third coefficient $k_{73}$, the fourth coefficient $k_{74}$, and the fifth coefficient $k_{75}$) associated with the radial line ID "H07" and the other set of internal parameters (the set of the first coefficient $k_{61}$, the second coefficient $k_{62}$, the third coefficient $k_{63}$, the fourth coefficient $k_{64}$, and the fifth coefficient $k_{65}$) associated with the radial line ID "H06", the internal parameter calculation unit 180 calculates a new set of internal parameters (the set of the first coefficient $k_1$, the second coefficient $k_2$, the third coefficient $k_3$, the fourth coefficient $k_4$, and the fifth coefficient $k_5$) by obtaining a weighted average of each pair of corresponding coefficients in the two sets of internal parameters as shown in Parts (b) to (f) of FIG. 12.

The internal parameter calculation unit 180 supplies the pixel position to be corrected and the new calculated set of internal parameters to the distortion-corrected image generator 192. The distortion-corrected image generator 192 obtains the pixel position to be corrected and the new set of internal parameters from the internal parameter calculation unit 180. In step S372, the distortion-corrected image generator 192 generates a distortion-corrected image from a distorted image by replacing a pixel value at the pixel position to be corrected with a pixel value at another pixel position on the basis of the new set of internal parameters.

For example, in a case where the pixel position p in Part (a) of FIG. 14 is to be corrected, when the internal parameter calculation unit 180 calculates the new set of internal parameters shown in Parts (b) to (f) of FIG. 12 to be applied to correct the pixel position p, the distortion-corrected image generator 192 calculates the image height $r_{cal}$ of a pixel position in the distortion-corrected image by substituting the new set of internal parameters shown in Parts (b) to (f) of FIG. 12 and the incident angle Θ in the equation of higher degree shown in Part (g) of FIG. 12. The distortion-corrected image is generated from the distorted image by replacing a pixel value at the pixel position p with a pixel value at another pixel position by this calculation.

Figure 15:
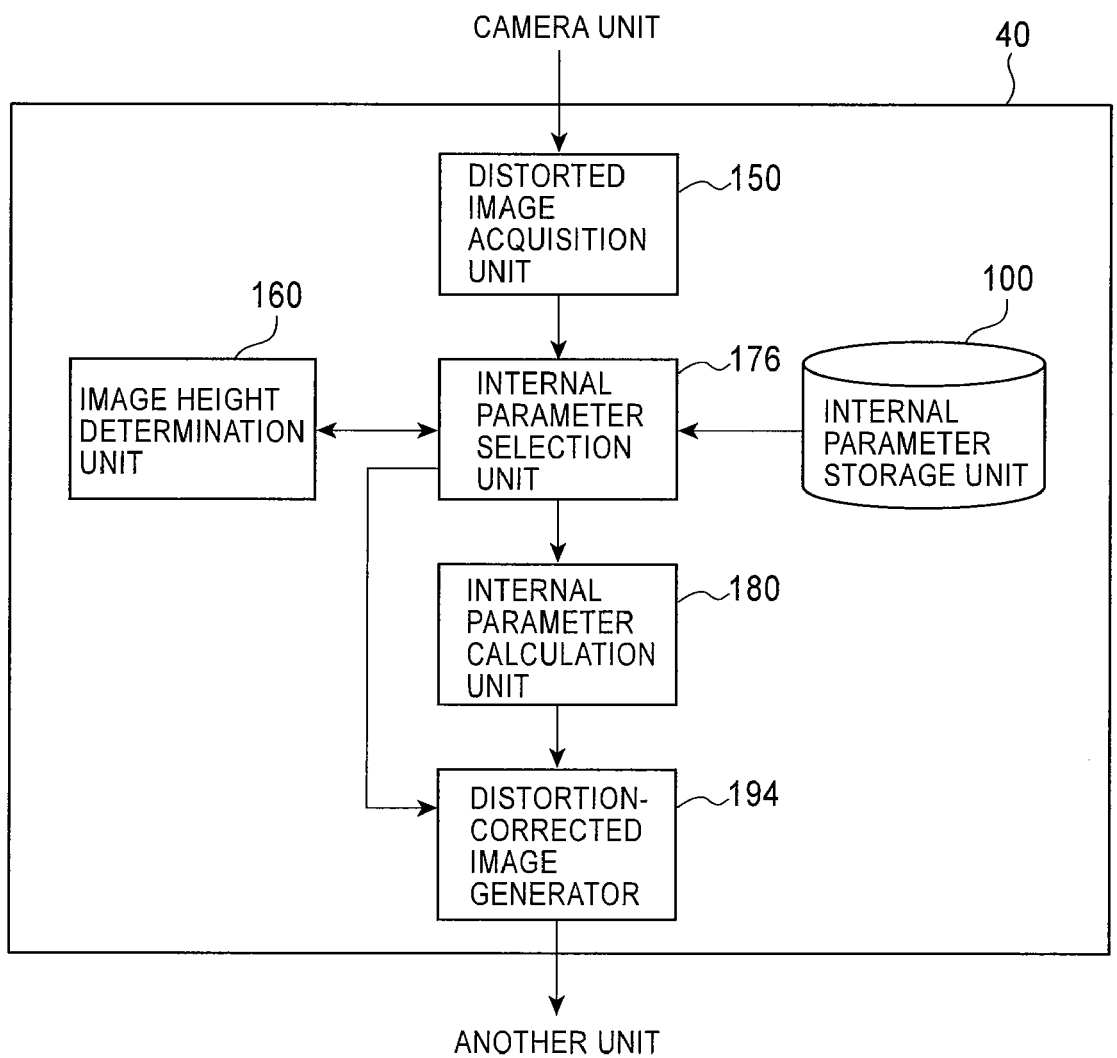
FIG. 15 shows exemplary components of a distortion-corrected image generation unit according to a fourth embodiment of the present invention.

A fourth embodiment of the present invention will now be described with reference to the drawings. FIG. 15 shows exemplary components of a distortion-corrected image generation unit 40 according to the fourth embodiment of the present invention. The distortion-corrected image generation unit 40 includes the internal parameter storage unit 100, the distorted image acquisition unit 150, an image height determination unit 160, an internal parameter selection unit 176, the internal parameter calculation unit 180, and a distortion-corrected image generator 194. Since the functions of the internal parameter storage unit 100, the distorted image acquisition unit 150, and the internal parameter calculation unit 180 are the same as those of individual blocks with the same reference numerals in the distortion-corrected image generation unit 30 shown in FIG. 11, the description of these functions is omitted.

The image height determination unit 160 determines whether an image height that represents the distance between a pixel position to be corrected in a distorted image, determined by the internal parameter selection unit 176, and the image principal point of the distorted image is less than a predetermined value. The image height determination unit 160 supplies, to the internal parameter selection unit 176, a result of determining whether the image height is less than the predetermined value.

The internal parameter selection unit 176 obtains the distorted image from the distorted image acquisition unit 150. The internal parameter selection unit 176 determines the pixel position to be corrected in the obtained distorted image. The internal parameter selection unit 176 supplies the determined pixel position to be corrected to the image height determination unit 160. When the internal parameter selection unit 176 receives, from the image height determination unit 160, a result of determining that the image height is less than the predetermined value, the internal parameter selection unit 176 selects, as a set of internal parameters to be applied to correct the pixel position to be corrected, one set of internal parameters associated with a radial line ID identifying a radial line, the distance between the radial line and the pixel position to be corrected being shortest.

On the other hand, when the internal parameter selection unit 176 receives, from the image height determination unit 160, a result of determining that the image height is equal to or more than the predetermined value, the internal parameter selection unit 176 selects a set of internal parameters associated with a radial line ID identifying a radial line, the distance between the radial line and the pixel position to be corrected being shortest, and a set of internal parameters associated with a radial line ID identifying a radial line, the distance between the radial line and the pixel position to be corrected being second shortest.

When the internal parameter selection unit 176 selects one set of internal parameters, the distortion-corrected image generator 194 generates a distortion-corrected image from the distorted image by replacing a pixel value at the pixel position to be corrected with a pixel value at another pixel position on the basis of the one set of internal parameters selected by the internal parameter selection unit 176.

When the internal parameter selection unit 176 selects two sets of internal parameters, the distortion-corrected image generator 194 generates a distortion-corrected image from the distorted image by replacing a pixel value at the pixel position to be corrected with a pixel value at another pixel position on the basis of a new set of internal parameters calculated by the internal parameter calculation unit 180.

Figure 16:
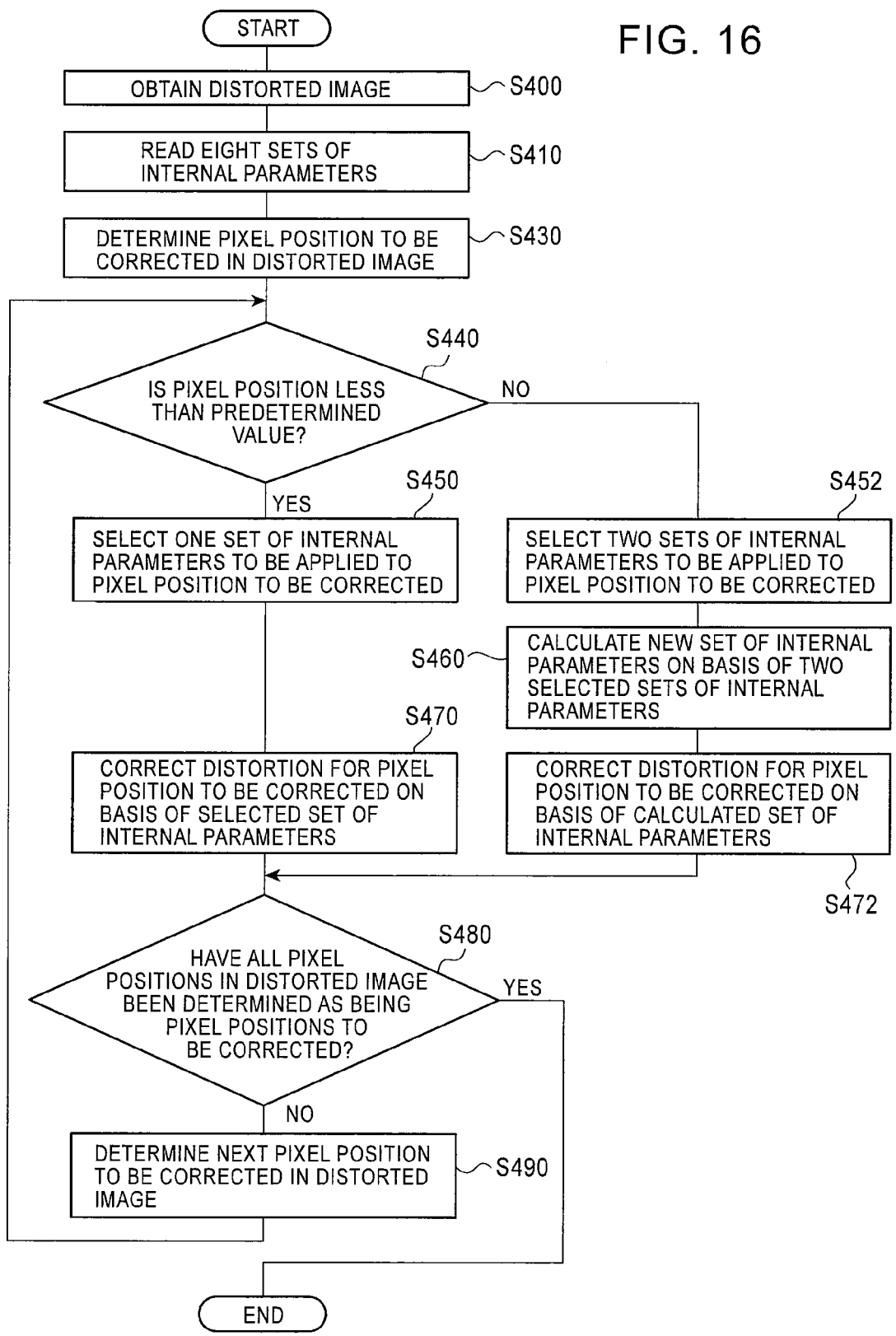
FIG. 16 is a flowchart showing an exemplary operation of the distortion-corrected image generation unit shown in FIG. 15.

The operation of the distortion-corrected image generation unit 40 will now be described. FIG. 16 is a flowchart showing an exemplary operation of the distortion-corrected image generation unit 40 shown in FIG. 15. FIG. 17 shows the relationship between pixel positions and internal parameters to be applied. Since the process in steps S400, S410, S430, S450, S470, S480, and S490 is the same as that in steps S100, S110, S130, S150, S170, S180, and S190 shown in FIG. 5, the description of these steps is omitted. Moreover, since the process in steps S452, S460, and S472 is the same as that in steps S352, S360, and S372 shown in FIG. 13, the description of these steps is omitted.

After step S430, the internal parameter selection unit 176 supplies a determined pixel position to be corrected to the image height determination unit 160. In step S440, the image height determination unit 160 determines whether an image height that represents the distance between the pixel position to be corrected in a distorted image, determined by the internal parameter selection unit 176, and the image principal point of the distorted image is less than a predetermined value. When the image height determination unit 160 determines that the image height is less than the predetermined value, the internal parameter selection unit 176 performs step S450. On the other hand, when the image height determination unit 160 determines that the image height is not less than the predetermined value, the internal parameter selection unit 176 performs step S452.

For example, when a pixel position p1 in a distorted image shown in Part (a) of FIG. 17 is to be corrected, in step S440, the image height determination unit 160 determines that the image height is less than the predetermined value r(Θ), and then in step S450, the internal parameter selection unit 176 selects one set of internal parameters (the set of the first coefficient $k_{21}$, the second coefficient $k_{22}$, the third coefficient $k_{23}$, the fourth coefficient $k_{24}$, and the fifth coefficient $k_{25}$). On the other hand, when a pixel position p2 in the distorted image shown in Part (a) of FIG. 17 is to be corrected, in step S440, the image height determination unit 160 determines that the image height is not less than the predetermined value r(Θ), and then in step S452, the internal parameter selection unit 176 selects two sets of internal parameters (the set of the first coefficient $k_{71}$, the second coefficient $k_{72}$, the third coefficient $k_{73}$, the fourth coefficient $k_{74}$, and the fifth coefficient $k_{75}$ and the set of the first coefficient $k_{61}$, the second coefficient $k_{62}$, the third coefficient $k_{63}$, the fourth coefficient $k_{64}$, and the fifth coefficient $k_{65}$).

When the pixel position p1 shown in Part (a) of FIG. 17 is to be corrected, in step S470, the distortion-corrected image generator 194 generates a distortion-corrected image shown in Part (b) of FIG. 17 from the distorted image shown in Part (a) of FIG. 17 by replacing a pixel value at the pixel position p1 in the distorted image shown in Part (a) of FIG. 17 with a pixel value at a pixel position q1 in the distortion-corrected image shown in Part (b) of FIG. 17. Moreover, when the pixel position p2 shown in Part (a) of FIG. 17 is to be corrected, in step S472, the distortion-corrected image generator 194 generates the distortion-corrected image shown in Part (b) of FIG. 17 from the distorted image shown in Part (a) of FIG. 17 by replacing a pixel value at the pixel position p2 in the distorted image shown in Part (a) of FIG. 17 with a pixel value at a pixel position q2 in the distortion-corrected image shown in Part (b) of FIG. 17.

Figure 18:
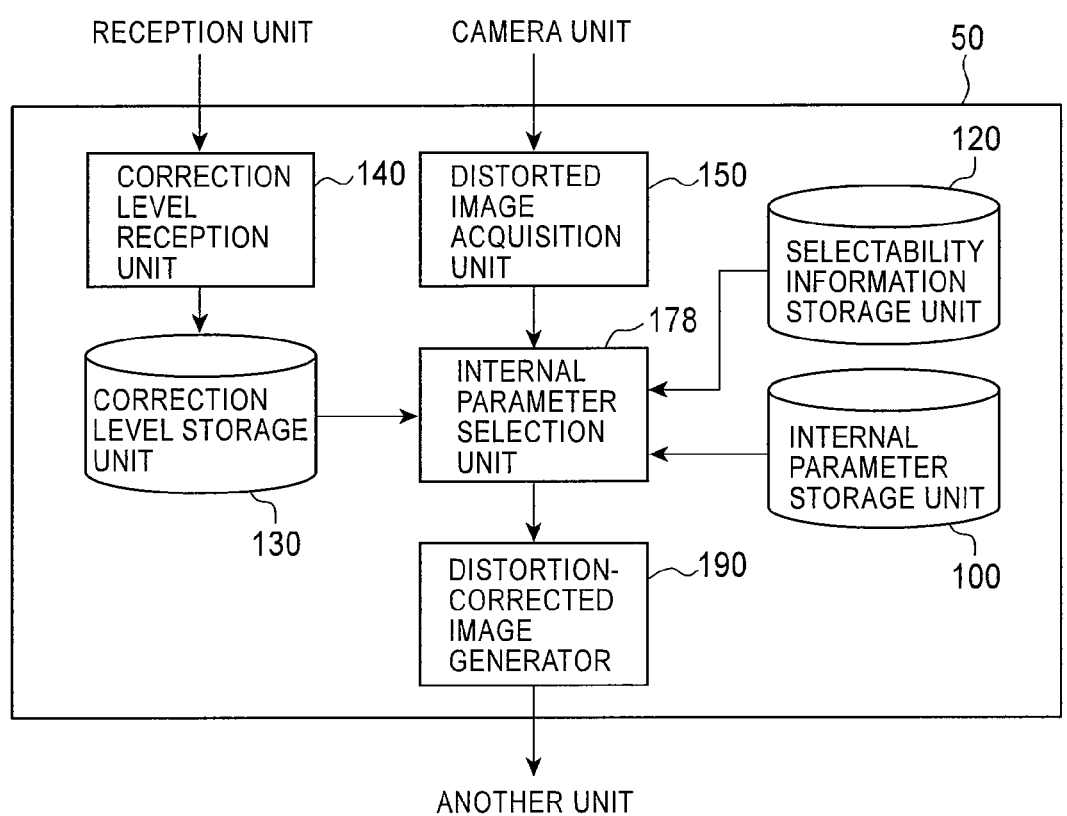
FIG. 18 shows exemplary components of a distortion-corrected image generation unit according to a fifth embodiment of the present invention.

A fifth embodiment of the present invention will now be described with reference to the drawings. FIG. 18 shows exemplary components of a distortion-corrected image generation unit 50 according to the fifth embodiment of the present invention. FIG. 19 shows exemplary information stored in a selectability information storage unit 120 and a correction level storage unit 130. The distortion-corrected image generation unit 50 includes the internal parameter storage unit 100, the selectability information storage unit 120, the correction level storage unit 130, a correction level reception unit 140, the distorted image acquisition unit 150, an internal parameter selection unit 178, and the distortion-corrected image generator 190. Since the functions of the internal parameter storage unit 100, the distorted image acquisition unit 150, and the distortion-corrected image generator 190 are the same as those of individual blocks with the same reference numerals in the distortion-corrected image generation unit 10 shown in FIG. 1, the description of these functions is omitted.

The selectability information storage unit 120 stores selectability information that represents the relationships between correction levels for correcting the distortion of distorted images and sets of internal parameters that can be selected for distortion correction at the respective correction levels. For example, when the internal parameter storage unit 100 stores the eight sets of internal parameters in association with the radial line IDs, as shown in FIG. 2A, the selectability information storage unit 120 stores selectability information that represents whether or not a set of internal parameters associated with each radial line ID can be selected at each correction level, as shown in Part (a) of FIG. 19.

The selectability information shown in Part (a) of FIG. 19 shows that four sets of internal parameters stored in the internal parameter storage unit 100 in association with radial line IDs "H02", "H04", "H06", and "H08" can be selected at a correction level at which the accuracy of distortion correction is relatively low (hereinafter called the low correction level). The selectability information shown in Part (a) of FIG. 19 further shows that the eight sets of internal parameters stored in the internal parameter storage unit 100 in association with radial line IDs "H01", "H02", "H03", "H04", "H05", "H06", "H07", and "H08" can be selected at a correction level at which the accuracy of distortion correction is relatively high (hereinafter called the high correction level).

Moreover, when the internal parameter storage unit 100 stores the eight sets of internal parameters in association with the region IDs, as shown in FIG. 2B, the selectability information storage unit 120 stores selectability information that represents whether or not a set of internal parameters associated with each region ID can be selected at each correction level, as shown in Part (b) of FIG. 19.

The selectability information shown in Part (b) of FIG. 19 shows that four sets of internal parameters stored in the internal parameter storage unit 100 in association with region IDs "R01", "R03", "R05", and "R07" can be selected at the low correction level. The selectability information shown in Part (b) of FIG. 19 further shows that the eight sets of internal parameters stored in the internal parameter storage unit 100 in association with region IDs "R01", "R02", "R03", "R04", "R05", "R06", "R07", and "R08" can be selected at the high correction level.

The selectability information shown in Part (b) of FIG. 19 further shows that, instead of each set of internal parameters that cannot be selected at the low correction level, another set of internal parameters associated with a region ID identifying a divided region adjacent to a divided region identified by a region ID associated with the set of internal parameters, which cannot be selected at the low correction level, is selected. For example, the selectability information shown in Part (b) of FIG. 19 shows that, instead of one set of internal parameters associated with the region ID "R02", another set of internal parameters associated with the region ID "R03" identifying the divided region R3 adjacent to the divided region R2 identified by the region ID "R02" is selected.

The correction level reception unit 140 receives the specification of the correction level from the outside (for example, a reception unit that receives the specification of the correction level from a user). Specifically, the correction level reception unit 140 receives, from the outside, one correction level from a plurality of correction levels. The relationships between the plurality of correction levels and selectable sets of internal parameters are shown by the selectability information stored in the selectability information storage unit 120. The correction level reception unit 140 stores the correction level received from the outside in the correction level storage unit 130. For example, when the correction level reception unit 140 receives the low correction level from the outside, the correction level reception unit 140 stores information "low correction level (1)" that indicates the low correction level in the correction level storage unit 130, as shown in Part (c) of FIG. 19.

The internal parameter selection unit 178 refers to the correction level stored in the correction level storage unit 130 and the selectability information stored in the selectability information storage unit 120 and selects one set of internal parameters to be applied to correct a pixel position to be corrected from sets of internal parameters that can be selected for distortion correction at the correction level stored in the correction level storage unit 130.

Figure 20:
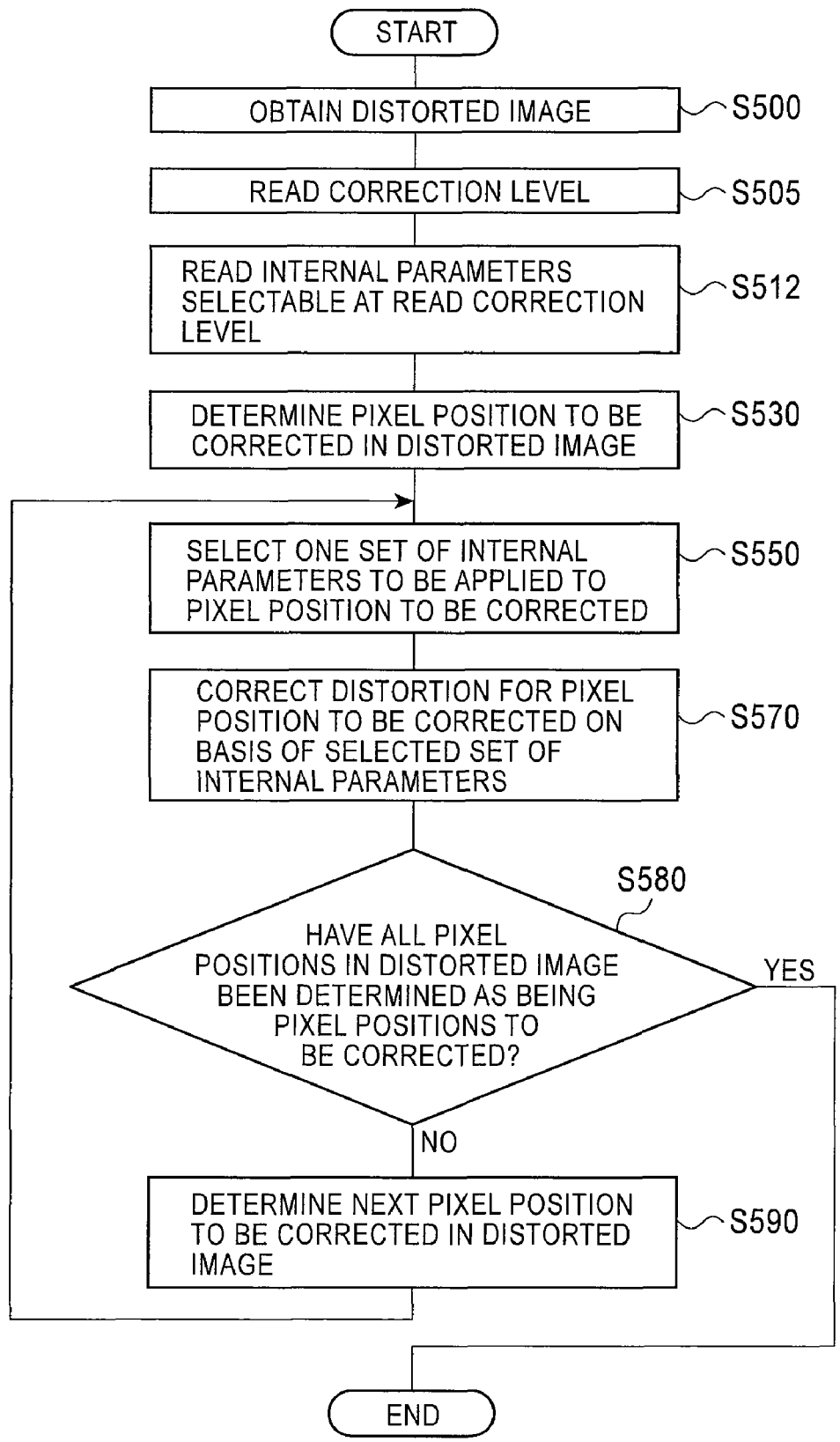
FIG. 20 is a flowchart showing an exemplary operation of the distortion-corrected image generation unit shown in FIG. 18.
Figure 22:
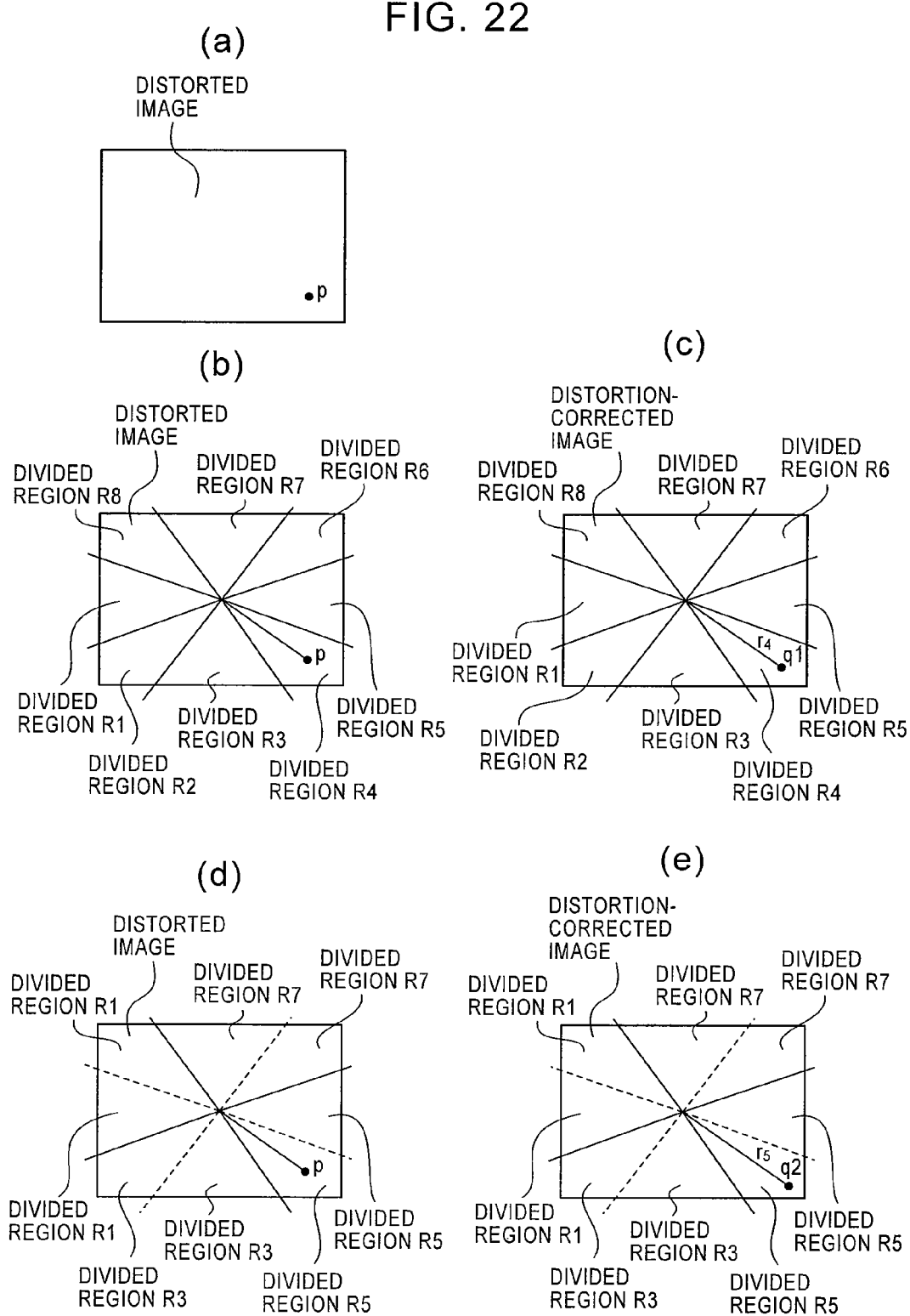
FIG. 22 shows the relationship between a pixel position and internal parameters to be applied in the fifth embodiment.

The operation of the distortion-corrected image generation unit 50 will now be described. FIG. 20 is a flowchart showing an exemplary operation of the distortion-corrected image generation unit 50 shown in FIG. 18. FIGS. 21 and 22 show the relationship between a pixel position and internal parameters to be applied. Since the process in steps S500, S530, S550, S570, S580, and S590 is the same as that in steps S100, S130, S150, S170, S180, and S190 shown in FIG. 5, the description of these steps is omitted.

After step S500, in step S505, the internal parameter selection unit 178 reads a correction level stored in the correction level storage unit 130. Then, in step S512, the internal parameter selection unit 178 reads sets of internal parameters in association with radial line IDs that can be selected at the correction level read in step S505 from the eight sets of internal parameters stored in the internal parameter storage unit 100. The internal parameter selection unit 178 further reads necessary radial line information (or divided region information).

For example, when the information shown in FIG. 2A is stored in the internal parameter storage unit 100, the information shown in Part (a) of FIG. 19 is stored in the selectability information storage unit 120, and information that indicates the high correction level is stored in the correction level storage unit 130, the internal parameter selection unit 178 reads the eight sets of internal parameters and the eight pieces of radial line information associated with the radial line IDs "H01", "H02", "H03", "H04", "H05", "H06", "H07", and "H08" from the internal parameter storage unit 100.

In a case where the pixel position p in a distorted image shown in Part (a) of FIG. 21 is to be corrected, when the internal parameter selection unit 178 reads the eight sets of internal parameters associated with the radial line IDs "H01", "H02", "H03", "H04", "H05", "H06", "H07", and "H08", in step S550, the internal parameter selection unit 178 selects one set of internal parameters associated with the radial line identification information "H07" identifying the radial line H7, the distance between the radial line H7 and the pixel position p being shortest, as shown in Part (b) of FIG. 21. Then, in step S570, the distortion-corrected image generator 190 generates a distortion-corrected image shown in Part (c) of FIG. 21 from the distorted image shown in Parts (a) and (b) of FIG. 21 by replacing a pixel value at the pixel position p in the distorted image shown in Parts (a) and (b) of FIG. 21 with a pixel value at the pixel position q1 in the distortion-corrected image shown in Part (c) of FIG. 21.

Moreover, when the information shown in FIG. 2A is stored in the internal parameter storage unit 100, the information shown in Part (a) of FIG. 19 is stored in the selectability information storage unit 120, and information that indicates the low correction level is stored in the correction level storage unit 130, the internal parameter selection unit 178 reads four sets of internal parameters and four pieces of radial line information associated with the radial line IDs "H02", "H04", "H06", and "H08" from the internal parameter storage unit 100.

In a case where the pixel position p in the distorted image shown in Part (a) of FIG. 21 is to be corrected, when the internal parameter selection unit 178 reads the four sets of internal parameters associated with the radial line IDs "H02", "H04", "H06", and "H08", in step S550, the internal parameter selection unit 178 selects one set of internal parameters associated with the radial line identification information "H06" identifying the radial line H6, the distance between the radial line H6 and the pixel position p being shortest, as shown in Part (d) of FIG. 21. Then, in step S570, the distortion-corrected image generator 190 generates a distortion-corrected image shown in Part (e) of FIG. 21 from the distorted image shown in Parts (a) and (d) of FIG. 21 by replacing a pixel value at the pixel position p in the distorted image shown in Parts (a) and (d) of FIG. 21 with a pixel value at the pixel position q2 in the distortion-corrected image shown in Part (e) of FIG. 21.

Moreover, when the information shown in FIG. 2B is stored in the internal parameter storage unit 100, the information shown in Part (b) of FIG. 19 is stored in the selectability information storage unit 120, and information that indicates the high correction level is stored in the correction level storage unit 130, the internal parameter selection unit 178 reads the eight sets of internal parameters and the eight pieces of divided region information associated with the region IDs "R01", "R02", "R03", "R04", "R05", "R06", "R07", and "R08" from the internal parameter storage unit 100.

In a case where the pixel position p in a distorted image shown in Part (a) of FIG. 22 is to be corrected, when the internal parameter selection unit 178 reads the eight sets of internal parameters associated with the region IDs "R01", "R02", "R03", "R04", "R05", "R06", "R07", and "R08", in step S550, the internal parameter selection unit 178 first refers to the information shown in Part (b) of FIG. 19 and determines whether a set of internal parameters associated with the region ID "R04" identifying the divided region R4 shown in Part (b) of FIG. 22 that includes the pixel position p can be selected at the high correction level. Then, the internal parameter selection unit 178 determines that the set of internal parameters associated with the region ID "R04" can be selected at the high correction level and selects the set of internal parameters associated with the region ID "R04" identifying the divided region R4. Then, in step S570, the distortion-corrected image generator 190 generates a distortion-corrected image shown in Part (c) of FIG. 22 from the distorted image shown in Parts (a) and (b) of FIG. 22 by replacing a pixel value at the pixel position p in the distorted image shown in Parts (a) and (b) of FIG. 22 with a pixel value at the pixel position q1 in the distortion-corrected image shown in Part (c) of FIG. 22.

Moreover, when the information shown in FIG. 2B is stored in the internal parameter storage unit 100, the information shown in Part (b) of FIG. 19 is stored in the selectability information storage unit 120, and information that indicates the low correction level is stored in the correction level storage unit 130, the internal parameter selection unit 178 reads four sets of internal parameters associated with the region IDs "R01", "R03", "R05", and "R07" and the eight pieces of divided region information associated with the region IDs "R01", "R02", "R03", "R04", "R05", "R06", "R07", and "R08" from the internal parameter storage unit 100.

In a case where the pixel position p in the distorted image shown in Part (a) of FIG. 22 is to be corrected, when the internal parameter selection unit 178 reads the four sets of internal parameters associated with the region IDs "R01", "R03", "R05", and "R07", in step S550, the internal parameter selection unit 178 first refers to the information shown in Part (b) of FIG. 19 and determines whether the set of internal parameters associated with the region ID "R04" identifying the divided region R4 shown in Part (b) of FIG. 22 that includes the pixel position p can be selected at the low correction level. Then, the internal parameter selection unit 178 determines that the set of internal parameters associated with the region ID "R04" cannot be selected at the low correction level and selects the set of internal parameters associated with the region ID "R05" instead of the region ID "R04". Then, in step S570, the distortion-corrected image generator 190 generates a distortion-corrected image shown in Part (e) of FIG. 22 from the distorted image shown in Parts (a) and (d) of FIG. 22 by replacing a pixel value at the pixel position p in the distorted image shown in Parts (a) and (d) of FIG. 22 with a pixel value at the pixel position q2 in the distortion-corrected image shown in Part (e) of FIG. 22.

In the distortion-corrected image generation units 10, 20, 30, 40, and 50, on the basis of the direction of a pixel position to be corrected from an image principal point, out of a plurality of sets of internal parameters stored in advance, one set of internal parameters to be applied to correct the pixel position to be corrected, i.e., one set of internal parameters that can accommodate errors of different magnitudes that occur in individual directions from an image principal point, is selected, and the distortion of a distorted image is corrected on the basis of the selected set of internal parameters. Thus, even when a surface of a lens is not exactly parallel to a surface of an image pickup device due to manufacturing tolerances, the distortion of a distorted image can be accurately corrected.

Moreover, in the distortion-corrected image generation unit 20, distortion correction is performed only for pixel positions in an output region instead of all pixel positions in a distorted image. Thus, distortion can be more accurately and rapidly corrected for a region that is actually needed by another unit related to the subsequent process, out of all regions of a distorted image.

Moreover, in the distortion-corrected image generation unit 30, distortion correction is performed using a new set of internal parameters generated by obtaining, in a manner that depends on each pixel position to be corrected, weighted averages of two sets of internal parameters stored in the internal parameter storage unit 100, i.e., a set of internal parameters that is most suitable to each pixel position to be corrected. Thus, the accuracy of distortion correction in this case is higher than the accuracy of distortion correction in which one set of internal parameters stored in the internal parameter storage unit 100 is used for each pixel position.

Moreover, in the distortion-corrected image generation unit 40, an area in which distortion correction is accurately performed taking time using, for each pixel position, a new set of internal parameters generated from two sets of internal parameters can be limited to the edge of a distorted image. Thus, while the time necessary to perform distortion correction is shorter than the time necessary to perform distortion correction for the entire area of the distorted image using, for each pixel position, a new set of internal parameters generated from two sets of internal parameters, for the edge of the distorted image in which distortion is likely to occur, the accuracy of distortion correction in this case is higher than the accuracy of distortion correction in which one set of internal parameters stored in the internal parameter storage unit 100 is used for each pixel position.

Moreover, in the distortion-corrected image generation unit 50, the number of sets of internal parameters to be selected varies with the correction level. Thus, in distortion correction of a distorted image, when the accuracy is more important than reduction in the processing time, distortion correction can be performed more accurately with an increased number of sets of internal parameters to be selected, and when reduction in the processing time is more important than the accuracy, distortion correction can be performed more rapidly with a reduced number of sets of internal parameters to be selected.

Moreover, in the distortion-corrected image generation units 10, 20, 30, 40, and 50, the internal parameter storage unit 100 stores the eight sets of internal parameters in total. However, the number of sets of internal parameters is not limited to eight. The internal parameter storage unit 100 may store any number, ranging from two to seven, of sets of internal parameters or more than eight sets of internal parameters in total.

Moreover, in the distortion-corrected image generation units 10, 20, 30, 40, and 50, the internal parameter storage unit 100 stores sets of internal parameters, each of the sets including a first coefficient (the linear coefficient of the incident angle $\Theta$), a second coefficient (the quadratic coefficient of the incident angle $\Theta$), a third coefficient (the tertiary coefficient of the incident angle $\Theta$), a fourth coefficient (the biquadratic coefficient of the incident angle $\Theta$), and a fifth coefficient (the quintic coefficient of the incident angle $\Theta$). However, the number of coefficients and the orders of the incident angle $\Theta$ corresponding to individual coefficients are not limited to this arrangement. For example, the internal parameter storage unit 100 may store sets of internal parameters, each of the sets including a first coefficient (the linear coefficient of the incident angle $\Theta$), a second coefficient (the tertiary coefficient of the incident angle $\Theta$), and a third coefficient (the quintic coefficient of the incident angle $\Theta$).

Moreover, in the distortion-corrected image generation unit 50, the selectability information storage unit 120 stores selectability information that represents the relationships between two correction levels (the low and high correction levels) and sets of internal parameters that can be selected for distortion correction at the respective correction levels. However, the number of correction levels is not limited to two. The selectability information storage unit 120 may store selectability information that represents the relationships between more than two correction levels and sets of internal parameters that can be selected for distortion correction at the respective correction levels.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. A distortion-corrected image generation unit that generates a distortion-corrected image by correcting distortion of a distorted image captured using a fish-eye lens, the distortion-corrected image generation unit comprising:

a distorted image acquisition unit that obtains the distorted image;

an internal parameter storage unit that stores a plurality of sets of internal parameters, related to the fish-eye lens, each of the sets being applied to correct a pixel position in a radially extending direction from an image principal point of the distorted image;

an internal parameter selection unit that selects, on the basis of a radial direction of a pixel position to be corrected in the distorted image obtained by the distorted image acquisition unit from the image principal point, one set of internal parameters to be applied to correct the pixel position to be corrected from the plurality of sets of internal parameters stored in the internal parameter storage unit; and a distortion-corrected image generator that generates the distortion-corrected image from the distorted image by replacing a pixel value at the pixel position to be corrected with a pixel value at another pixel position on the basis of the set of internal parameters selected by the internal parameter selection unit.

2. The distortion-corrected image generation unit according to claim 1, further comprising:

an output region information storage unit that stores output region information that represents an output region to be externally output, out of regions of the distorted image, wherein the internal parameter selection unit refers to the output region information stored in the output region information storage unit and determines, as the pixel position to be corrected, a pixel position in the output region indicated by the output region information.

3. The distortion-corrected image generation unit according to claim 1, wherein the internal parameter storage unit stores the plurality of sets of internal parameters in association with radial line identification information identifying a plurality of lines that radially extend from the image principal point and divide an entire region of the distorted image.

4. The distortion-corrected image generation unit according to claim 3, wherein the internal parameter selection unit selects, as a set of internal parameters to be applied to correct the pixel position to be corrected, one set of internal parameters associated with the radial line identification information identifying a radial line, the distance between the radial line and the pixel position to be corrected being shortest.

5. The distortion-corrected image generation unit according to claim 3, further comprising:

an internal parameter calculation unit that calculates a new set of internal parameters by obtaining weighted averages of a plurality of sets of internal parameters, wherein the internal parameter selection unit selects, as sets of internal parameters to be applied to correct the pixel position to be corrected, a first set of internal parameters associated with the radial line identification information identifying a radial line, the distance between the radial line and the pixel position to be corrected being shortest, and a second set of internal parameters associated with the radial line identification information identifying a radial line, the distance between the radial line and the pixel position to be corrected being second shortest, the internal parameter calculation unit calculates a new set of internal parameters by obtaining weighted averages of the first and second sets of internal parameters selected by the internal parameter selection unit, and the distortion-corrected image generator generates the distortion-corrected image from the distorted image on the basis of the new set of internal parameters calculated by the internal parameter calculation unit instead of the first and second sets of internal parameters selected by the internal parameter selection unit.

6. The distortion-corrected image generation unit according to claim 3, further comprising:

an internal parameter calculation unit that calculates a new set of internal parameters by obtaining weighted averages of a plurality of sets of internal parameters; and an image height determination unit that determines whether an image height that represents distance between the pixel position to be corrected and the image principal point is less than a predetermined value, wherein, when the image height determination unit determines that the image height is less than the predetermined value, the internal parameter selection unit selects, as a set of internal parameters to be applied to correct the pixel position to be corrected, a first set of internal parameters associated with the radial line identification information identifying a radial line, the distance between the radial line and the pixel position to be corrected being shortest, and when the image height determination unit determines that the image height is equal to or more than the predetermined value, the internal parameter selection unit selects, as sets of internal parameters to be applied to correct the pixel position to be corrected, the first set of internal parameters and a second set of internal parameters associated with the radial line identification information identifying a radial line, the distance between the radial line and the pixel position to be corrected being second shortest, when the first and second sets of internal parameters are selected, the internal parameter calculation unit calculates a new set of internal parameters by obtaining weighted averages of the first and second sets of internal parameters selected by the internal parameter selection unit, and when the internal parameter calculation unit calculates the new set of internal parameters, the distortion-corrected image generator generates the distortion-corrected image from the distorted image on the basis of the new set of internal parameters calculated by the internal parameter calculation unit instead of the first and second sets of internal parameters selected by the internal parameter selection unit.

7. The distortion-corrected image generation unit according to claim 1, wherein the internal parameter storage unit stores the plurality of sets of internal parameters in association with region identification information for identifying a plurality of divided regions into which an entire region of the distorted image is divided and that radially extend from the image principal point.

8. The distortion-corrected image generation unit according to claim 7, wherein the internal parameter selection unit selects, as a set of internal parameters to be applied to correct the pixel position to be corrected, one set of internal parameters associated with the region identification information identifying a divided region that includes the pixel position to be corrected.

9. The distortion-corrected image generation unit according to claim 1, further comprising:

a selectability information storage unit that stores selectability information that represents relationships between correction levels for correcting distortion of the distorted image and sets of internal parameters that can be selected for correcting the distortion at the respective correction levels;

a correction level reception unit that receives a correction level; and a correction level storage unit that stores the correction level received by the correction level reception unit, wherein the internal parameter selection unit refers to the correction level stored in the correction level storage unit and the selectability information stored in the selectability information storage unit and selects one set of internal parameters to be applied to correct the pixel position to be corrected at the correction level stored in the correction level storage unit from the sets of internal parameters, which can be selected for correcting the distortion.

10. A method for generating a distortion-corrected image by correcting distortion of a distorted image captured using a fish-eye lens, the method comprising:

obtaining the distorted image;

when the distorted image is obtained, referring to an internal parameter storage unit that stores a plurality of sets of internal parameters, related to the fish-eye lens, each of the sets being applied to correct a pixel position in a radially extending direction from an image principal point of the distorted image, and selecting, on the basis of a radial direction of a pixel position to be corrected in the distorted image from the image principal point, one set of internal parameters to be applied to correct the pixel position to be corrected from the plurality of sets of internal parameters stored in the internal parameter storage unit; and when the set of internal parameters is selected, generating the distortion-corrected image from the distorted image by replacing a pixel value at the pixel position to be corrected with a pixel value at another pixel position on the basis of the selected set of internal parameters.

11. The distortion-corrected image generation method according to claim 10, further comprising:

providing an output region information storage method that stores output region information that represents an output region to be externally output, out of regions of the distorted image, wherein the internal parameter selection act refers to the output region information stored in the output region information storage unit and determines, as the pixel position to be corrected, a pixel position in the output region indicated by the output region information.

12. The distortion-corrected image generation method according to claim 10, wherein the internal parameter storage unit stores the plurality of sets of internal parameters in association with radial line identification information identifying a plurality of lines that radially extend from the image principal point and divide an entire region of the distorted image.

13. The distortion-corrected image generation method according to claim 12, wherein the internal parameter selection act selects, as a set of internal parameters to be applied to correct the pixel position to be corrected, one set of internal parameters associated with the radial line identification information identifying a radial line, the distance between the radial line and the pixel position to be corrected being shortest.

14. The distortion-corrected image generation method according to claim 12, further comprising:

an internal parameter calculation act that calculates a new set of internal parameters by obtaining weighted averages of a plurality of sets of internal parameters, wherein the internal parameter selection act selects, as sets of internal parameters to be applied to correct the pixel position to be corrected, a first set of internal parameters associated with the radial line identification information identifying a radial line, the distance between the radial line and the pixel position to be corrected being shortest, and a second set of internal parameters associated with the radial line identification information identifying a radial line, the distance between the radial line and the pixel position to be corrected being second shortest, the internal parameter calculation act calculates a new set of internal parameters by obtaining weighted averages of the first and second sets of internal parameters selected by the internal parameter selection act, and the method generates the distortion-corrected image from the distorted image on the basis of the new set of internal parameters calculated by the internal parameter calculation act instead of the first and second sets of internal parameters selected by the internal parameter selection act.

15. The distortion-corrected image generation method according to claim 12, further comprising:

an internal parameter calculation act that calculates a new set of internal parameters by obtaining weighted averages of a plurality of sets of internal parameters; and an image height determination act that determines whether an image height that represents distance between the pixel position to be corrected and the image principal point is less than a predetermined value, wherein, when the image height determination act determines that the image height is less than the predetermined value, the internal parameter selection act selects, as a set of internal parameters to be applied to correct the pixel position to be corrected, a first set of internal parameters associated with the radial line identification information identifying a radial line, the distance between the radial line and the pixel position to be corrected being shortest, and when the image height determination act determines that the image height is equal to or more than the predetermined value, the internal parameter selection act selects, as sets of internal parameters to be applied to correct the pixel position to be corrected, the first set of internal parameters and a second set of internal parameters associated with the radial line identification information identifying a radial line, the distance between the radial line and the pixel position to be corrected being second shortest, when the first and second sets of internal parameters are selected, the internal parameter calculation act calculates a new set of internal parameters by obtaining weighted averages of the first and second sets of internal parameters selected by the internal parameter selection act, and when the internal parameter calculation act calculates the new set of internal parameters, the method generates the distortion-corrected image from the distorted image on the basis of the new set of internal parameters calculated by the internal parameter calculation act instead of the first and second sets of internal parameters selected by the internal parameter selection act.

16. The distortion-corrected image generation method according to claim 10, wherein the internal parameter storage unit stores the plurality of sets of internal parameters in association with region identification information for identifying a plurality of divided regions into which an entire region of the distorted image is divided and that radially extend from the image principal point.

17. The distortion-corrected image generation method according to claim 16, wherein the internal parameter selection act selects, as a set of internal parameters to be applied to correct the pixel position to be corrected, one set of internal parameters associated with the region identification information identifying a divided region that includes the pixel position to be corrected.

18. The distortion-corrected image generation method according to claim 10, further comprising:

providing a selectability information storage unit that stores selectability information that represents relationships between correction levels for correcting distortion of the distorted image and sets of internal parameters that can be selected for correcting the distortion at the respective correction levels;

a correction level reception act that receives a correction level; and providing a correction level storage unit that stores the correction level received by the correction level reception act, wherein the internal parameter selection act refers to the correction level stored in the correction level storage unit and the selectability information stored in the selectability information storage unit and selects one set of internal parameters to be applied to correct the pixel position to be corrected at the correction level stored in the correction level storage unit from the sets of internal parameters, which can be selected for correcting the distortion.

* * * * *